(12) United States Patent
Todd et al.

(10) Patent No.: US 7,231,317 B2
(45) Date of Patent: Jun. 12, 2007

(54) CORRELATING POWER SIGNATURES WITH AUTOMATED EQUIPMENT

(75) Inventors: Douglas Wallace Todd, Tucson, AZ (US); Diana Joyce Hellman, Tucson, AZ (US); Michael Philip McIntosh, Tucson, AZ (US); Jason Lee Peipelman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 10/339,515

(22) Filed: Jan. 8, 2003

(65) Prior Publication Data

US 2004/0133378 A1 Jul. 8, 2004

(51) Int. Cl.
  *G06F 11/30* (2006.01)
(52) U.S. Cl. ...................... 702/183; 324/522
(58) Field of Classification Search ............ 702/57–59, 702/62, 64–68, 71, 76, 77, 81–84, 90–91, 702/115–124, 179, 181, 182–185, 193; 219/130.1, 219/130.32, 130.33; 324/546, 522; 714/25; 341/20

See application file for complete search history.

(56) References Cited

U.S. PATENT DOCUMENTS

| | | | |
|---|---|---|---|
| 3,983,379 A | 9/1976 | Scott | |
| 4,215,412 A * | 7/1980 | Bernier et al. | 701/100 |
| 4,551,837 A | 11/1985 | Geogelein et al. | 371/25 |
| 4,763,066 A | 8/1988 | Yeung et al. | 324/73 |
| 4,807,161 A | 2/1989 | Comfort et al. | 364/550 |
| 5,136,590 A | 8/1992 | Polstra et al. | 371/16.2 |
| 5,160,928 A * | 11/1992 | Rigat-Esselin et al. | 341/20 |
| 5,349,688 A | 9/1994 | Nguyen | 395/800 |
| 5,446,682 A * | 8/1995 | Janke et al. | 702/85 |
| 5,572,444 A * | 11/1996 | Lentz et al. | 702/117 |
| 5,629,870 A | 5/1997 | Farag et al. | 364/551.01 |
| 5,689,194 A * | 11/1997 | Richards et al. | 324/772 |
| 5,726,911 A | 3/1998 | Canada et al. | 364/550 |
| 5,727,000 A | 3/1998 | Pizzica | 371/26 |

(Continued)

FOREIGN PATENT DOCUMENTS

JP   2000035462 A   2/2000

OTHER PUBLICATIONS

IBM TDB, Automatic/Robotic Test Generation And Diagnostic System Using Signature Analysis, Dec. 1988, vol. 31 No. 7 p. 273-275.

(Continued)

*Primary Examiner*—Marc S. Hoff
*Assistant Examiner*—Mohamed Charioui
(74) *Attorney, Agent, or Firm*—Zilka-Kotab, PC

(57) ABSTRACT

A method and system for monitoring the activity of a system of one or more electro-mechanical components that receive electrical current from a power supply. The method and system samples an actual current supplied to the electro-mechanical component from the power supply. Next, the method and system reads a theoretical current for the activity of the system. A statistical value is computed from comparing the actual current and the theoretical current. This statistical value is compared to upper and lower threshold values. Depending upon this comparison, the system issues various output messages. Further, if this comparison indicates that one of the electro-mechanical components is failing, the method and system will shut that component down.

27 Claims, 16 Drawing Sheets

U.S. PATENT DOCUMENTS

| | | | |
|---|---|---|---|
| 5,750,957 A * | 5/1998 | Kilty et al. | 219/130.1 |
| 5,835,380 A | 11/1998 | Roethig | 364/488 |
| 5,864,658 A * | 1/1999 | Theobald | 714/25 |
| 6,172,509 B1 * | 1/2001 | Cash et al. | 324/546 |
| 6,185,482 B1 * | 2/2001 | Egolf et al. | 700/293 |
| RE37,151 E | 5/2001 | LaFountain | 73/39 |
| 6,240,372 B1 * | 5/2001 | Gross et al. | 702/71 |
| 6,297,742 B1 | 10/2001 | Canada et al. | 340/635 |
| 6,421,618 B1 * | 7/2002 | Kliman et al. | 702/58 |
| 6,679,899 B2 * | 1/2004 | Wiener et al. | 606/169 |

OTHER PUBLICATIONS

IBM Research Disclosure, Method For Improving Cryptographic Ciphers Against Power-Analysis Attacks, Apr. 2001, vol. 663 No. 44169.

* cited by examiner

CORRELATING POWER SIGNATURES WITH AUTOMATED EQUIPMENT

FIELD OF THE INVENTION

The present invention relates to the field of methods and systems used to test and monitor the current consumption of an electrical-mechanical device. More specifically, the present invention relates to a method and apparatus to perform correlation and statistical analysis of the time varying power consumption of a system of electrical-mechanical devices receiving power from one or more power supplies.

BACKGROUND OF THE INVENTION

There is a great need for testing and monitoring the operation of electrical-mechanical components of systems. For corporations that produce systems with electrical-mechanical components, it is necessary to test the manufactured systems for defects before shipping the systems to customers, thereby increasing profitability and customer satisfaction. The industries that utilize these electrical-mechanical components want to minimize machine down time for their customers. Having devices and systems that can characterize the operation of the electrical-mechanical components, and then identify and report causes of failure, can reduce the amount of machine down time for the customer and enhance the profitability of the corporation which produced the systems and the customer using the systems. The vast importance of quality control cannot be overstated.

Many devices and systems today include a large number of electrical-mechanical components that require testing and monitoring. For instance, large library data storage systems include a variety of servo-mechanisms, DC-servo motors, and solenoids. Similarly, modern automobiles use a variety of electrical-mechanical components to operate the various features of an automobile such as power mirrors, power door locks, power track release, and a retractable radio antenna. In many cases, all of the electrical-mechanical components are connected to a single power supply. Alternatively, multiple power supplies are used to provide power for multiple electrical-mechanical components individually, or in groups. Connecting test equipment for each and every single electrical-mechanical component when a system failure occurs is a time consuming and hence costly procedure for a customer engineer. It is highly desirable to develop a method and system than can test the function of multiple electrical-mechanical components simultaneously without having to instrument and test each device individually There are numerous systems and devices known in the current state of the art that address the need to test and monitor electrical-mechanical components. U.S. Pat. No. 5,629,870 entitled "Method and Apparatus for Predicting Electric Induction Machine Failure During Operation" discloses one such testing and monitoring system for induction motors. This patent teaches a method and apparatus for identifying in real time an operating condition of an in-service induction motor, which draws a power load, by monitoring the frequency content of the power signature and associating the frequency components with device operating conditions. The method and apparatus taught by the '870 patent uses a data conditioning sampler to monitor and sample the current used by the induction motor. The patent describes that each induction motor has a separate control transformer. The patent goes on to disclose that a data conditioning sampler is coupled to each respective control transformer to sample the induction motor current. Alternatively, the patent teaches that a multiplexer could be used to enable one data conditioning sampler to interact with multiple control transformers and sample induction motor current.

The data gathered by the data conditioning sampler is in the time domain. An electrical device, referred to in the patent as a preprocessor, converts the time domain data gathered by the data conditioning sampler into the frequency domain by performing a Fast Fourier Transform (FFT) on the data. A filter, referred to as a spectral characteristic component selector filter, selects for analysis at least one specific frequency by referencing a database containing typical operational frequencies of the motor. A neural network then associates the selected frequency with an operating condition of the motor. An additional processor may then enunciate the association to a user via an output device. In addition, this processor may generate a control signal to operate an electrical distribution system protection or a control apparatus.

Another system to monitor the performance of electrical motors is taught by U.S. Pat. No. 5,689,194 entitled "Acoustic Motor Current Signature Analysis System with Audio Amplified Speaker Output." This patent essentially teaches a system that converts a noise portion of the motor current signal into an audio signal within an audible frequency range. The patent discloses that the system has an input for receiving a motor current noise signal. A demodulator then demodulates the motor current noise signal. A signal conditioner filters the noise signal selecting predetermined frequencies of the motor current noise and removing unwanted frequencies and harmonics from the motor current noise signal. A signal translator shifts the selected frequencies of the motor current noise signal into an audio bandwidth. An audio section having an amplifier and a speaker coupled to the amplifier amplifies and plays the selected frequencies of the motor current noise signal.

Both of the U.S. Pat. Nos. 5,629,870 and 5,689,194 discussed above teach testing and monitoring systems that are directed solely towards induction motors. However, a great deal of modern equipment uses electrical-mechanical devices other than just induction motors. For instance, large library data storage systems include numerous servo-mechanisms that also require monitoring. Many systems use solenoids. It is highly desirable to have a testing and monitoring system that can function for devices other than just induction motors. In addition, U.S. Pat. No. 5,629,870 teaches an induction motor monitoring system that monitors each motor individually by sampling current data from each individual motor. It is highly desirable to develop a system that can monitor systems of multiple interconnected electrical-mechanical devices by sampling current data from a single node in the system instead of from each individual device.

Other devices and systems used to test electrical equipment are currently known in the art. A system for testing integrated circuits is disclosed in U.S. Pat. No. 4,763,066 entitled "Automatic Test Equipment for Integrated Circuits." The apparatus taught by this patent includes a semiconductor tester that produces an analog signature signal relative to a circuit node of an electronic circuit, such as a pin connection of an integrated circuit. The analog signature signal is the result of horizontal and vertical signals that are also directed to an integrator/A-D converter. The integrator/A-D converter produces therefrom a set of four digital signals representing said analog signature. These digital signals are then compared in a computer against reference digital values for the same circuit node of the same electronic circuit that is known to be good. If the digital signals are not within a selected range relative to the reference digital values, the analog signature of the circuit node is displayed for inspection and evaluation by an operator.

SUMMARY OF THE INVENTION

The present invention is a method and apparatus that determines the operational condition of a system of electrical-mechanical components operating in a single piece of equipment. A vast number of modern equipment devices are comprised of a system of different electrical-mechanical components such as logic, communications, solenoids, as well as Direct Current (DC) brush, DC brushless, and induction motors.

This invention tests and monitors a system of electrical-mechanical components using principles of signals and communication systems. Each electrical-mechanical component produces a time varying current signal during its normal operation. As the electrical-mechanical component is powered on, powered off, and operates under various loading conditions, its current demands on the power supply will vary with time, thereby creating a unique current signal. When various electrical-mechanical components operate simultaneously from the same power supply, the time-varying current signals of each device will become a single current signal through summation. A current monitor samples this single current signal and performs a statistical analysis on the data.

This single actual current signal is then compared to an ideal current signal stored in a database. While the actual current signal is monitored and sampled by the current monitor as a function of time, a time record of events is kept by a device controller. For instance, for a storage library, events like load tape, unload tape, read data, or write data will occur. Each of these events will cause specific electrical-mechanical components in the storage library to perform various functions thereby drawing a unique current signal from the power supply. This unique current signal for each set of operations can be comprised of a signal having several unique amplitudes occurring at specific periods of time in a specific sequence. Through comparing the actual versus the ideal current signal over the time record of events, it is possible to match specific operational modes of the device with the amplitude and time variance of the current signal drawn from the power supply and, thus, it is possible to determine the operation of each individual electrical-mechanical component.

Based upon the above analyses performed by the invention, the invention will output a diagnostic message. In addition, based upon the above analyses performed by the invention, the invention may output a machine instruction.

In a preferred embodiment of the invention, the current monitor is only temporarily attached to the equipment device to facilitate a quality control test prior to shipment of the device to the customer. In an alternative embodiment, the current monitor is permanently attached to the equipment device to allow for continuous real-time monitoring of the equipment device while in normal operation.

DETAILED DESCRIPTION OF THE PREFERRED EMBODIMENTS

Figure 1:
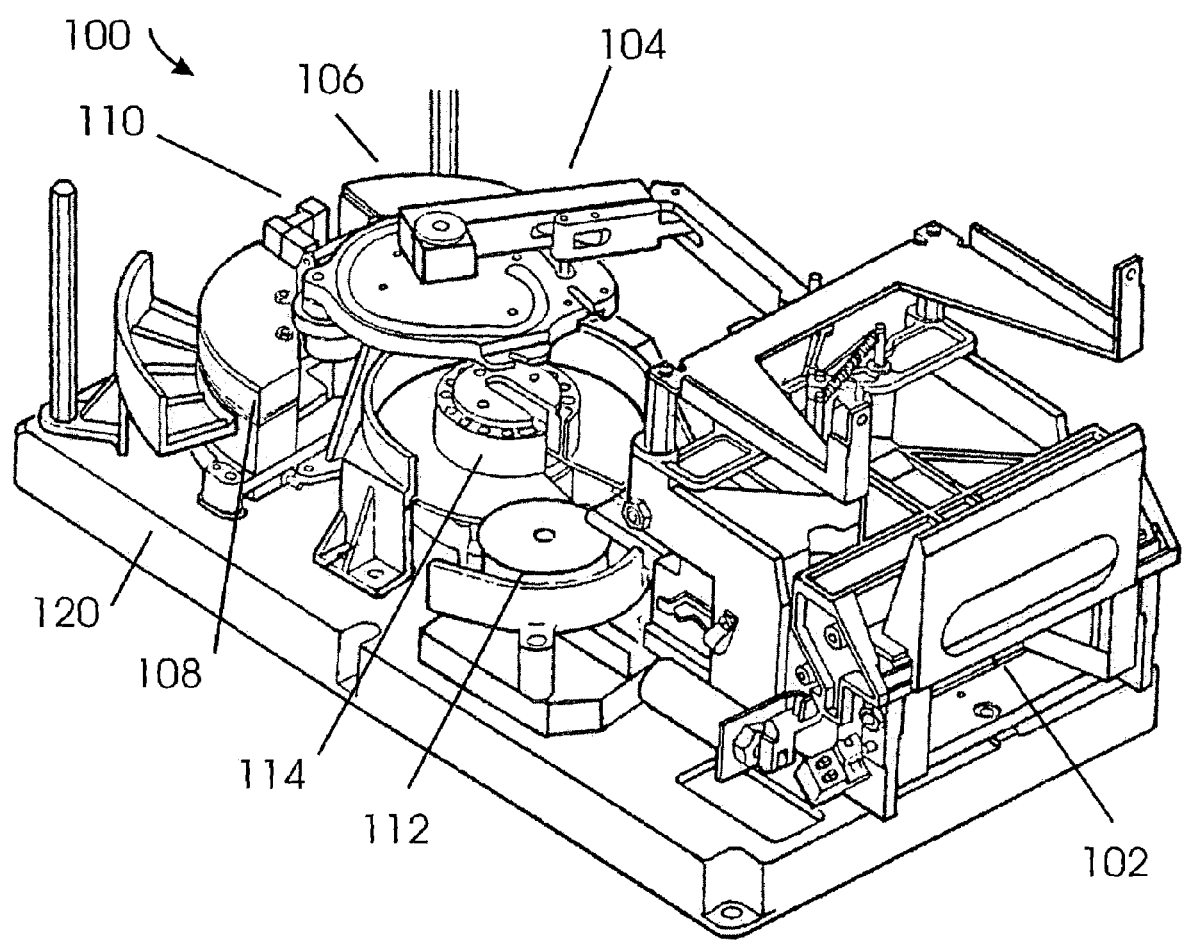
FIG. 1 depicts a typical tape drive.

FIG. 1 depicts a typical reel-to-reel tape drive 100. Tape drive 100 may be any one of a family of tape drives using a single-reel tape cartridge, such as the IBM 3480, IBM 3490, IBM 3590, and Linear Tape Open (LTO) tape drives. Cartridge loader 102 receives the single-reel tape cartridge and threader 104 threads the leader-block of the tape around the tape guides 106 and 108, and around the tape tension transducer 112, and into the take-up reel 114. Tape guides 106 and 108 support the tape as the tape flies over the magnetic tape head 110. All of these components are supported by base plate 120.

One single-reel magnetic tape cartridge is documented in U.S. Pat. No. 4,426,047; entitled "Single Reel Tape Cartridge," by Richard and Winarski, which is incorporated by reference in its entirety. The control of reel-to-reel tape drive 100 is documented in U.S. Pat. No. 4,125,881; entitled Tape Motion Control for Reel-to-Reel Drive, by Eige, et-al, which is incorporated in its entirety.

Figure 2:
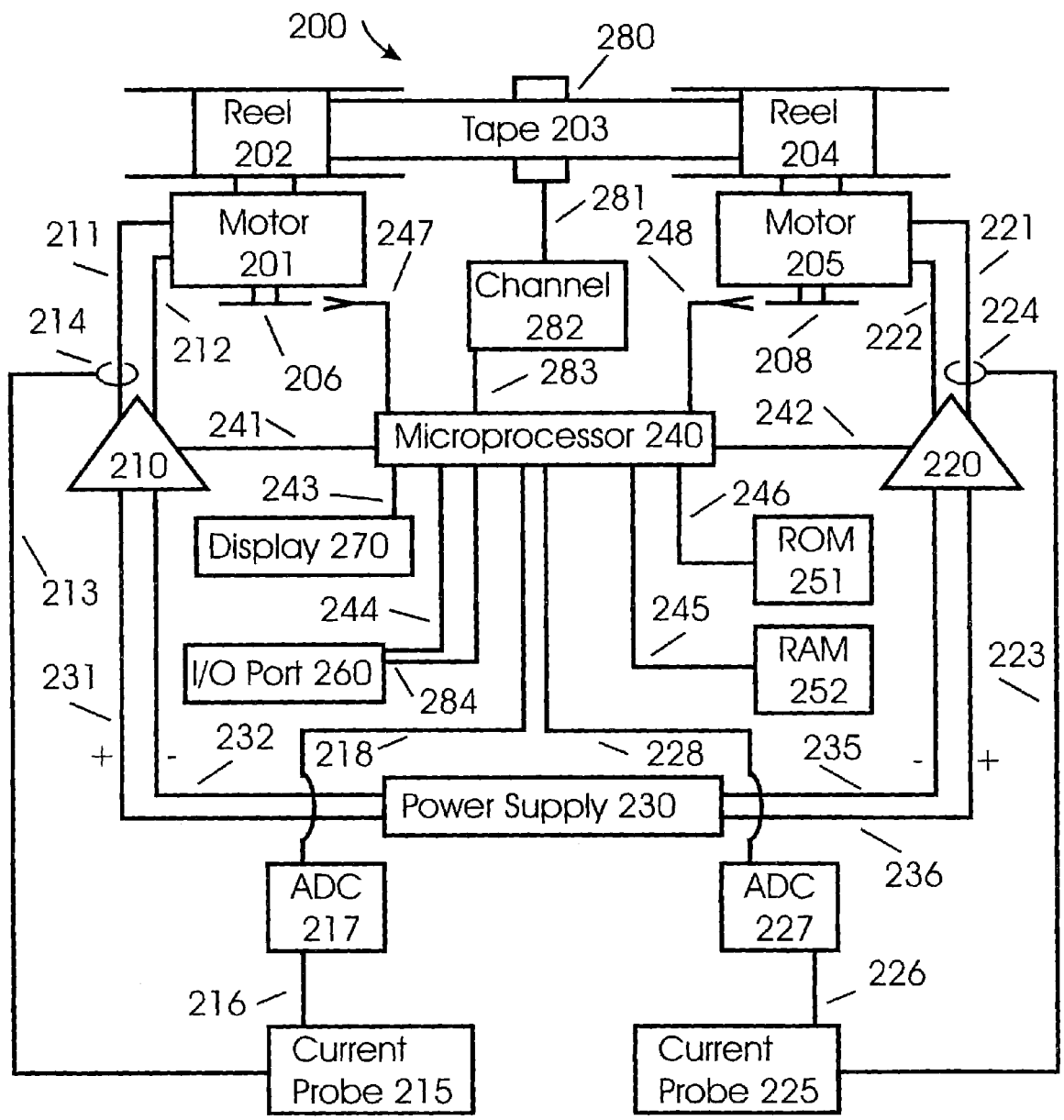
FIG. 2 depicts a block diagram of the electromechanical components of the tape drive of FIG. 1 where current is sampled at each motor.

Block diagram 200 of the electromechanical components of tape drive 100 is depicted in FIG. 2. Motor 201 rotates tape reel 202 and motor 205 rotates tape reel 204. As tape reels 202 and 204 rotate, tape 203 is passed across tape head 280 for the purposes of data I/O (Input/Output). Magnetic tape head 280 is preferably a flat tape head as documented in U.S. Pat. No. 5,905,613; entitled "Bidirectional Flat Contour Linear Tape Recording Head and Drive," by Biskeborn and Eaton, which is incorporated by reference. However, any contour of tape head may be used and the elements of the tape head may be thin-film write elements and preferably Magnetoresistive (MR) read elements. Alternately, Giant Magnetoresistive (GMR) read elements may be used in magnetic tape head 280.

Reel 202 may be in a single-reel tape cartridge, and reel 204 is then the take-up reel. Alternately, reels 202 and 204 may be in a dual reel cassette, such as the IBM Magstar MP 3570 tape cartridge.

Motors 201 and 205, reels 202 and 204, and tape 203 are referred to as the plant which needs to be controlled. This control is done by microprocessor 240. Microprocessor 240 gathers tape position and velocity information from optical encoder 206 mounted on motor 201 and optical encoder 208 mounted on motor 205. Microprocessor 240 reads optical encoder 206 via encoder reader 247 and reads optical encoder 208 via encoder reader 248. The information gathered from optical encoders 206 and 208 enables microprocessor 240 to calculate the outer tape radii on reels 202 and 204, as described by Eige, et-al. From these radii, the instantaneous rotational mass moment of inertia of reels 202 and 204 are calculated. With the mass moment of inertia of motors 201 and 205 known, via Eige et-al, microprocessor 240 reads the theoretical current that is necessary to accelerate reels 202 and 204 to reach the recording velocity, and then to decelerate the reels to stop the tape after all data I/O is completed. These theoretical currents are read via table-lookup from tables of theoretically required current versus reel radius from read-only memory (ROM) 251. ROM 251 may alternately be an erasable programmable read-only memory (EPROM) or electrically erasable programmable read-only memory (EEPROM). Alternately, microprocessor 240 may have an internal analytical model of tape drive 100 and calculate the theoretically required currents on-the-fly.

Once microprocessor 240 either reads from table lookup or calculates the theoretically required currents, it sends the current requirements to amplifier 210 for motor 201 and amplifier 220 for motor 205. Amplifier 210 receives current from power supply 230, via positive polarity conductor 231 and negative polarity conductor 232. Amplifier 220 receives current from power supply 230, via positive polarity conductor 236 and negative polarity conductor 235. Microprocessor 240 sends control information via line 241 to amplifier 210 and sends control information via line 242 to amplifier 220. Amplifiers 210 and 220 serve to regulate the current fed to motors 201 and 205, respectively, so that reels 202 and 204 can properly rotate to move tape 203 across head 280.

Motor 201 receives current from amplifier 210 via positive polarity conductor 211 and negative polarity conductor 212. Current probe 215 measures the actual current in conductor 211 via loop 214 which passes around conductor 211. Loop 214 is connected to current probe 215 via line 213. The output of current probe 215 is sampled and digitized by analog to digital converter (ADC) 217. Microprocessor 240 reads the digital output of ADC 217 via line 218. The actual current in conductor 211 is a function of the back EMF (electromotive force) of motor 201, so that the actual current flowing in conductor 211 may differ from the theoretical current requirement fed to amplifier 210 by microprocessor 240.

Motor 205 receives current from amplifier 220 via positive polarity conductor 221 and negative polarity conductor 222. Current probe 225 measures the actual current in conductor 221 via loop 224 which passes around conductor 221. Loop 224 is connected to current probe 225 via line 223. The output of current probe 225 is sampled and digitized by analog to digital converter (ADC) 227. Microprocessor 240 reads the digital output of ADC 227 via line 228. The actual current in conductor 221 is a function of the back EMF (electromotive force) of motor 205, so that the actual current flowing in conductor 221 may differ from the theoretical current requirement fed to amplifier 220 by microprocessor 240.

Head 280 writes data to tape 203 or reads data from tape 203 via channel 282. Channel 282 is connected to the thin film write elements and magnetoresistive read elements of head 280 via head cable 281. Additionally, head 280 may have read elements designed to read prerecorded servo tracks on tape 203 and head 280 may be on a coarse actuator so that head 280 may seek between groups of data tracks on tape 203. Additionally, head 280 may further be on a fine actuator which is mounted on the coarse actuator, which allows head 280 to follow variations in the lateral guiding tape 203 as it passes over head 280. Channel 282 receives data from or sends data to I/O port 260 via lines 283 and 284. Additionally, microprocessor 240 receives commands from I/O port 260 from a host via line 244 or send information such as diagnostic messages to the host via I/O port 260. Such diagnostic messages may be in the Simple Network Management Protocol (SNMP) trap alert format, as described in RFC-1157 (Request For Change), which is widely accepted in the computer industry. Microprocessor 240 may display diagnostic information on display 270, via line 243. Additionally, microprocessor 240 may store the vector of theoretical currents Yi and the vector of actual currents Xi in random access memory (RAM) 252, via line 245, for the calculation of correlation coefficient R. For vectors Yi and Xi, the index "i" varies from 1 to M, where M is the number of samples gathered by microprocessor 240 during the region of comparison of the theoretical current Yi and the actual current Xi versus time.

Figure 3:
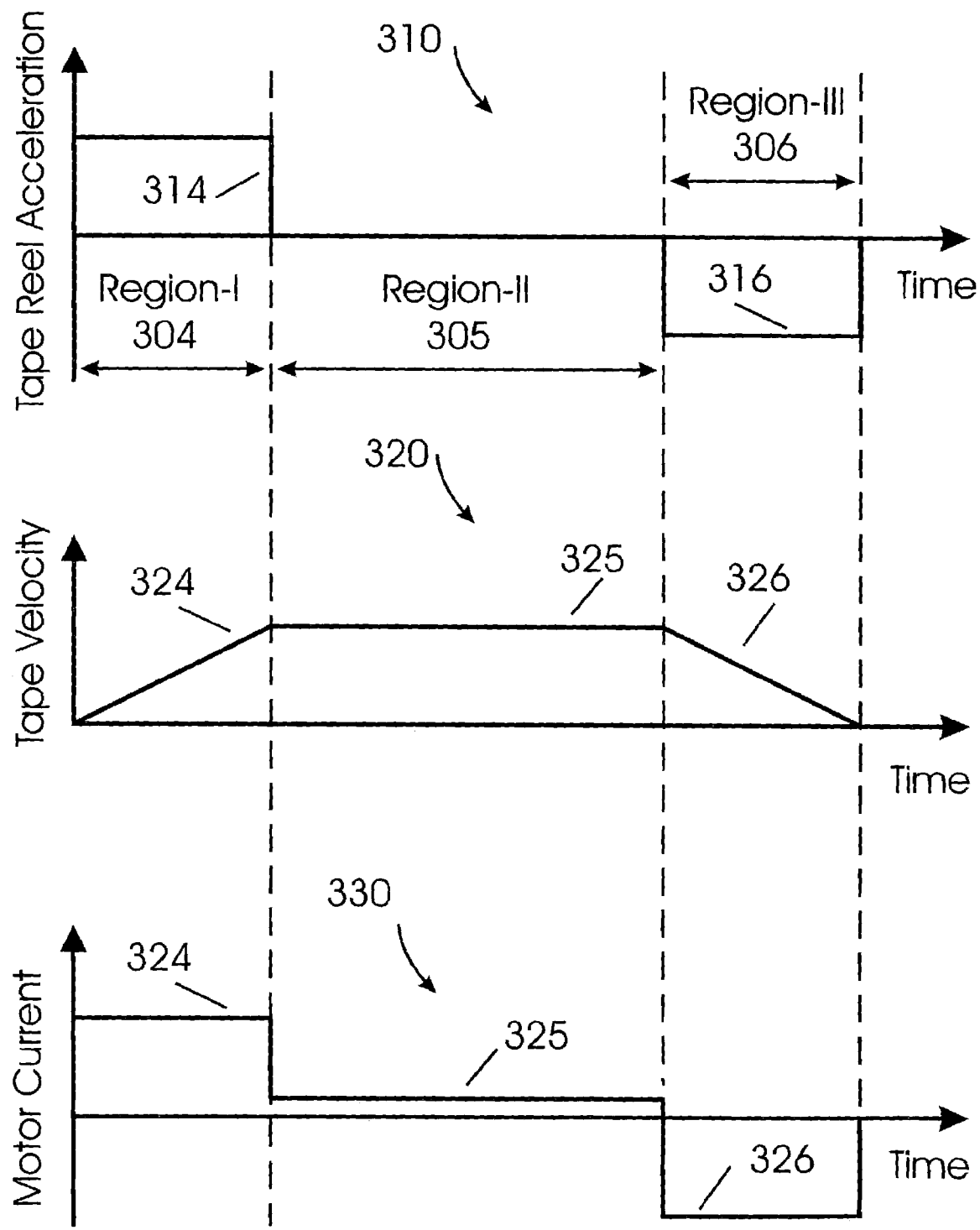
FIG. 3 depicts typical current usage of a motor of the tape drive of FIG. 1, based on specific events in the tape drive.

FIG. 3 depicts typical tape-reel acceleration profile 310, tape velocity profile 320, and motor current profile 330. These profiles are divided into three regions, region-I 304, region-II 305, and region-I 306. Region-I is preferably a constant acceleration region, where the tape reels accelerate at constant acceleration 314 from a standstill to recording velocity 325 for data I/O. Region-II is preferably a constant tape velocity region, where data I/O is performed. Finally, region-III is preferably a constant deceleration region, where the tape decelerates at constant deceleration 316 from the recording velocity to a standstill. Furthermore, acceleration 314 is preferably the same magnitude as deceleration 316. However, acceleration 314 may have a different magnitude from deceleration 316.

Tape velocity profile 320 is that of a trapezoid. Due to constant acceleration 314 in region-I, the tape velocity in region-I is ramp 324. Once tape 203 ramps up to the recording velocity, microprocessor 240 adjusts current to motors 201 and 205 to maintain constant tape velocity 325. Variations to constant tape velocity 325 are permitted within a pre-specified tolerance, such as +/−5%. During constant tape velocity 325, data I/O takes place between head 280 and tape 203. Once the data I/O has concluded, tape 203 is typically stopped via deceleration 316. During this deceleration from recording velocity 325 to zero velocity, the tape velocity in region-III is ramp 326. The combination of velocity ramp 324, constant velocity 325, and velocity ramp 326 is the characteristic trapezoidal velocity pattern seen in the motion of tape in tape drives. This trapezoidal velocity pattern is also seen in the motion of robotic pickers in automated storage libraries and the seeking of heads across the disks of magnetic and optical disk drives.

The motor current profile 330 also describes a characteristic pattern. In acceleration region-I, motor current 324 is typically high in order to accelerate the rotational mass moment of inertia of the tape reel, the tape itself, and the rotor of the motor itself. In region-II, motor current 325 is typically small, just enough to counteract motor inertia, frictional forces in the tape path such as tape 203 flying across head 280, and to place a tension on the tape so that the tape flies repeatably across head 280 in order to maintain cartridge interchange between a large population of tape cartridges and tape drives. Then, in region-III, decelerating motor current 326 is typically high and in the opposite polarity from accelerating motor current 324 in order to stop the spinning reels and bring the tape to a standstill when data I/O has been completed.

Figure 4:
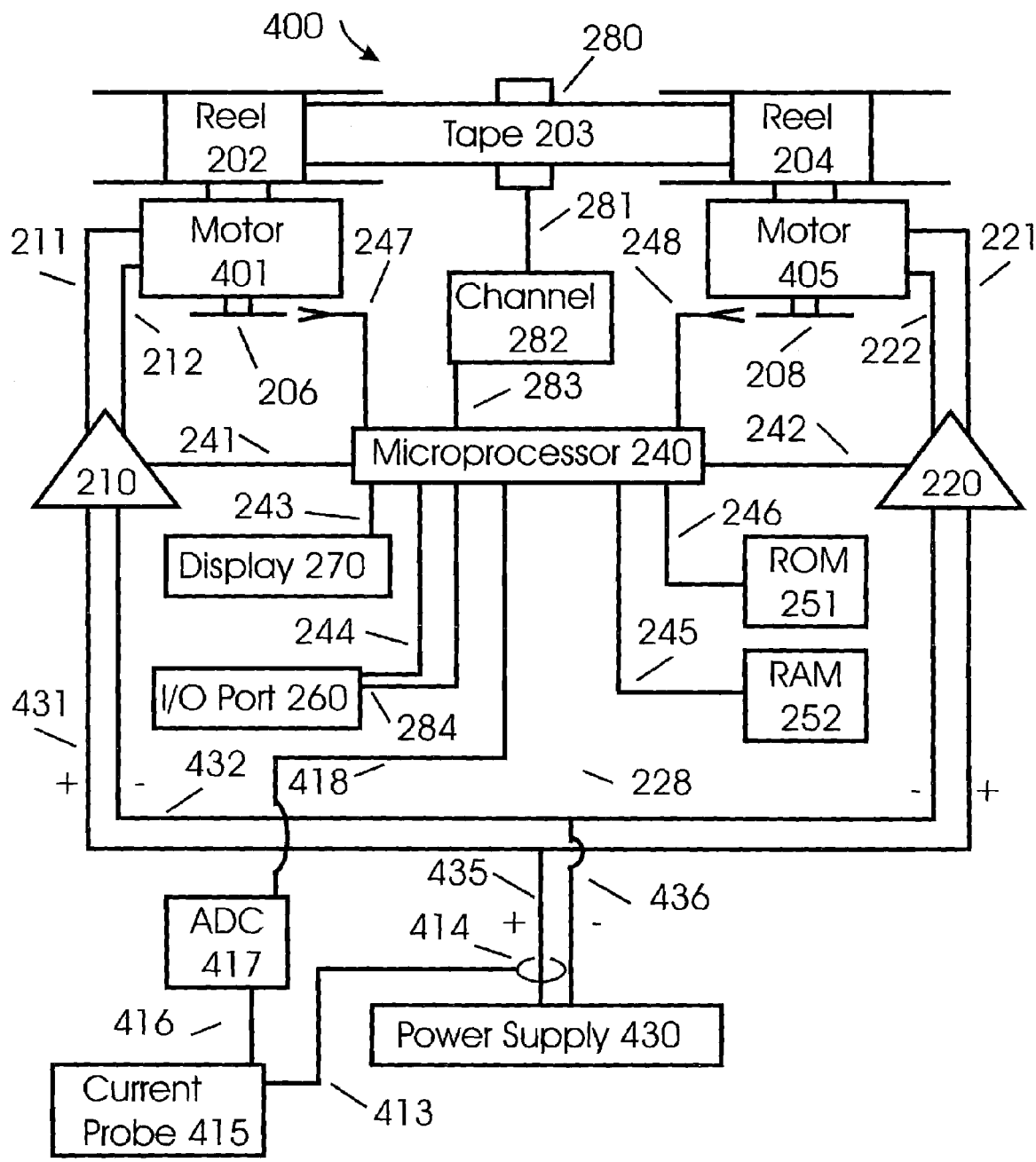
FIG. 4 depicts electromechanical components of the tape drive of FIG. 1 where current is sampled at the power supply.

FIG. 4 depicts an alternative to FIG. 2, where the current is sampled at the power supply itself rather than at each motor. In FIG. 4, power supply 430 supplies current to both amplifiers 210 and 220 via positive polarity conductor 431 and negative polarity conductor 432. Positive polarity conductor 431 is attached to power supply 430 via positive polarity conductor 435. Negative polarity conductor 432 is attached to power supply 230 via negative polarity conductor 436.

FIG. 4 shows that motor 401 receives current from amplifier 210 via positive polarity conductor 211 and negative polarity conductor 212. Motor 405 receives current from amplifier 220 via positive polarity conductor 221 and negative polarity conductor 222. As in FIG. 2, FIG. 4 shows that microprocessor 240 uses control line 241 to control the output current of amplifier 210 which goes to motor 401. Similarly, microprocessor 240 uses control line 242 to control the output current of amplifier 220 which goes to motor 405.

Figure 5:
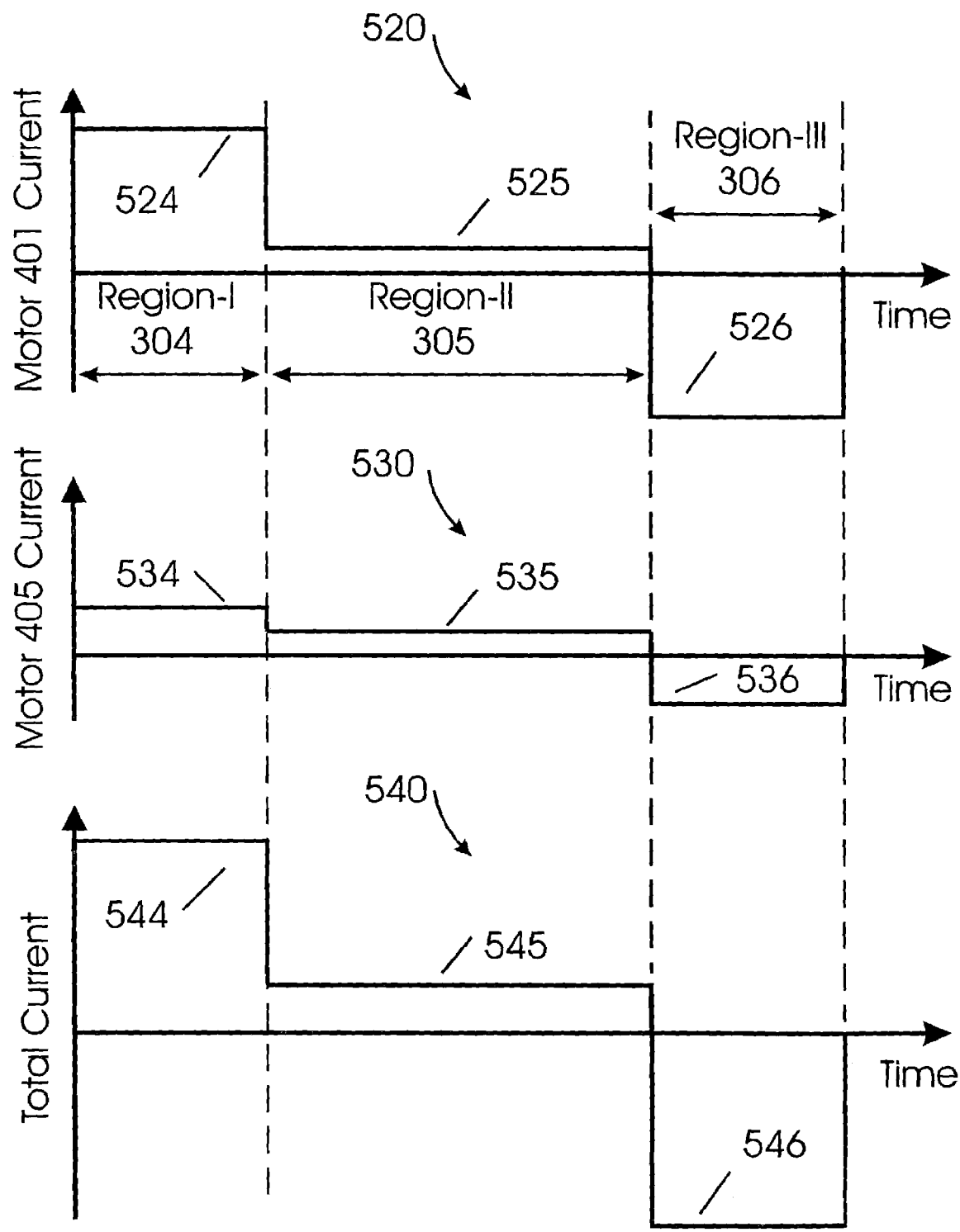
FIG. 5 depicts typical current usage of each motor of the tape drive and the summation of those currents as measured at the power supply.

FIG. 5 depicts current profile 520 as supplied to motor 401, current profile 530 as supplied to motor 405, and the sum of these two currents as total current profile 540. Current profiles 520, 530, and 540 all have the same constant acceleration region-I 304, constant recording velocity region-II 305, and constant deceleration region-III 306 as shown in FIG. 3. However, the acceleration current 524, constant recording velocity current 525, and deceleration current 526 of current profile 520 for motor 401 is typically not equal to the acceleration current 534, constant recording velocity current 535, and deceleration current 536 of current profile 530 for motor 405. The primary reason for this is that the outer radius of tape 203 on reel 202 is only equal to the outer radius of tape 203 on reel 204 at middle-of-tape (MOT). At beginning-of-tape (BOT) almost all of tape 203 is on reel 202 and very little on reel 204. At end-of-tape the situation is reversed and almost all of tape 203 is on reel 204 and very little tape 203 is on reel 202. The more tape 203 on a reel greatly affects the rotational mass moment of inertia which must be accelerated and decelerated by the respective motor. Thus, for the typical scenario of a constant acceleration profile 310 of FIG. 3, the motor with the reel with the most tape 203 on it uses the most current to accelerate in region-I 304 and decelerate in region-III 306. In FIG. 5, it is assumed that reel 202 is at beginning-of-tape and thus has most of tape 203, which means that motor 401 has the larger rotational mass moment of inertia to accelerate and decelerate versus motor 405. Thus, the current 524 used by motor 401 in acceleration region-I 304 and the current 526 deceleration region-III 306 is larger than the respective currents 534 and 536 used by motor 405 in those same regions. These currents vary as tape 203 is moved between the reels 202 and 204, which is why microprocessor 240 continually updates the theoretical current values sent to amplifier 210 and 220 via either table lookup of those theoretical current values or the on-the-fly calculation of those theoretical current values.

Total current profile 540 represents the superposition of current profiles 520 and 530, according to Kirchoff's current law. Kirchoff's current law, which is the conservation of mass law expressed in the form of a current equation, states that current can neither be created nor destroyed. Thus, Kirchoff's current law can be stated that the algebraic sum of all the currents at a node in a circuit equals zero. Thus, the current supplied by power supply 430 in FIG. 4 is the sum of the current supplied to each of motors 401 and 405. Current probe 415 measures the actual current in conductor 435 via loop 414 which passes around conductor 435. Loop 414 is connected to current probe 415 via line 413. The output of current probe 415 is sampled and digitized by analog to digital converter (ADC) 417. Microprocessor 240 reads the digital output of ADC 417 via line 418. The actual current in conductor 435 is a function of the back EMF (electromotive force) of both motors 401 and 405, so that the actual current flowing in conductor 435 may differ from the theoretical current requirement fed to amplifiers 210 and 220 by microprocessor 240. Thus, FIG. 4 accomplishes the same goal as FIG. 2, but with one fewer current probe and one fewer ADC. Power supply 430 also supplies current to microprocessor 240, ROM 251, RAM 252, channel 282, and all other semiconductor chips used by tape drive 100. However, this power is typically not routed through positive polarity conductor 435 because semiconductor chips typically use very small current levels at low voltage, such as +/−3.3 volts or +/−5 volts.

Figure 6:
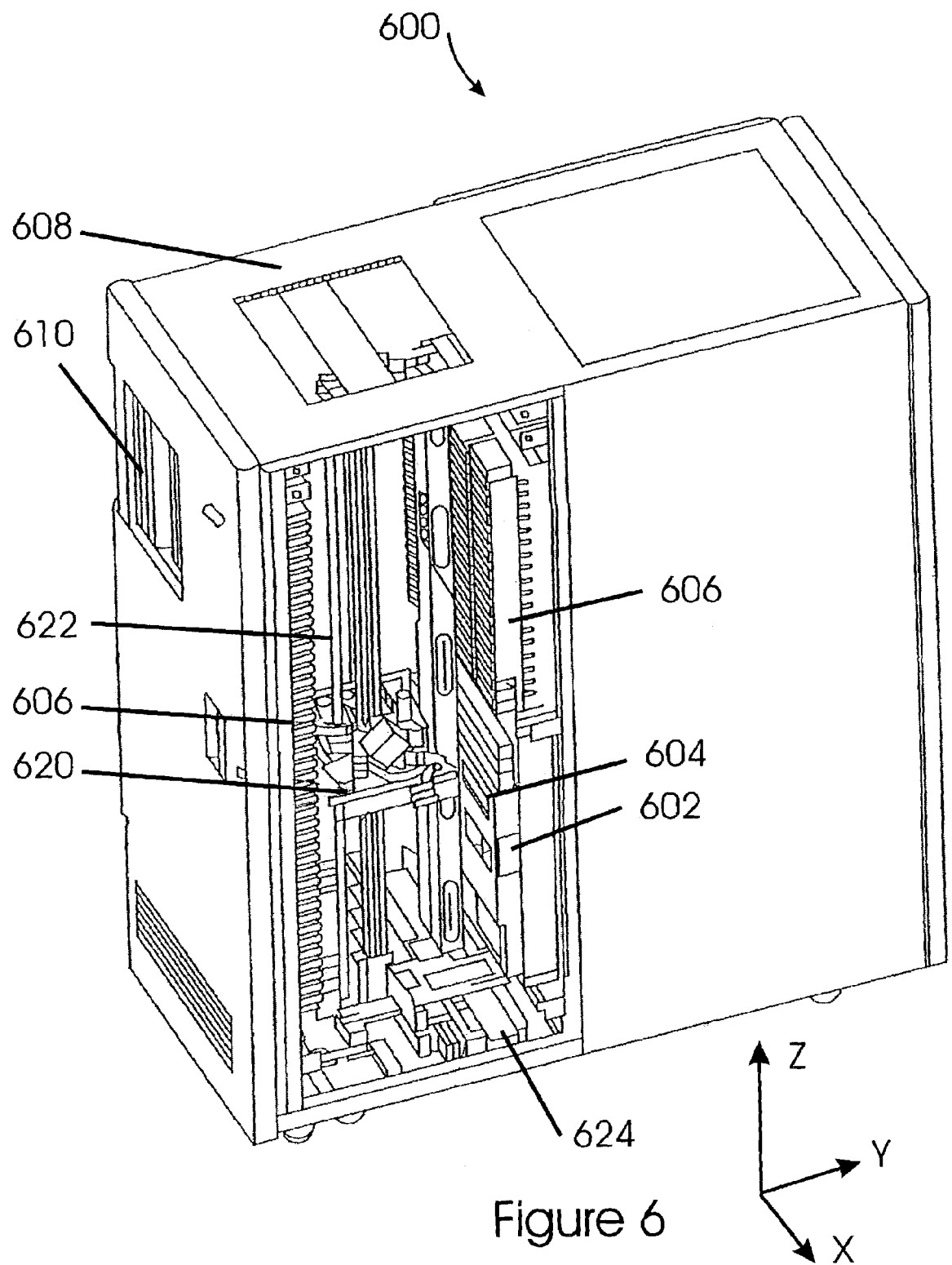
FIG. 6 depicts an automated tape library.

FIG. 6 depicts automated storage library 600. Library 600 comprises a plurality of storage cells 606 for preferably holding either single-reel tape cartridges or dual-reel tape cassettes. Robotic picker 620 moves these tape cartridges or cassettes between storage cells 606 and tape drives 602. Robotic picker 620 uses robotic grippers to grasp a cartridge or cassette from storage cell 606 along the Y-axis and insert it into opening 604 of tape drive 602, again along the Y-axis, for the purpose of conducting data I/O. Once that data I/O is concluded, the tape cartridge or cassette is moved back to a storage cell to free drive 602 for a new tape-mount request.

Library 600 resides in housing 608. There is a cartridge input/output station 610 to allow the tape cartridges or cassettes to be entered or retrieved from library 600.

Robotic picker 620 preferably moves horizontally along the X-axis via rack-and-pinion 624. However, motion along the X-axis could alternately be provided with powered wheels. Robotic picker 620 preferably moves vertically along the Z-axis via lead screw 622. However robotic picker 620 could move vertically along the Z-axis via tension cables.

Figure 7:
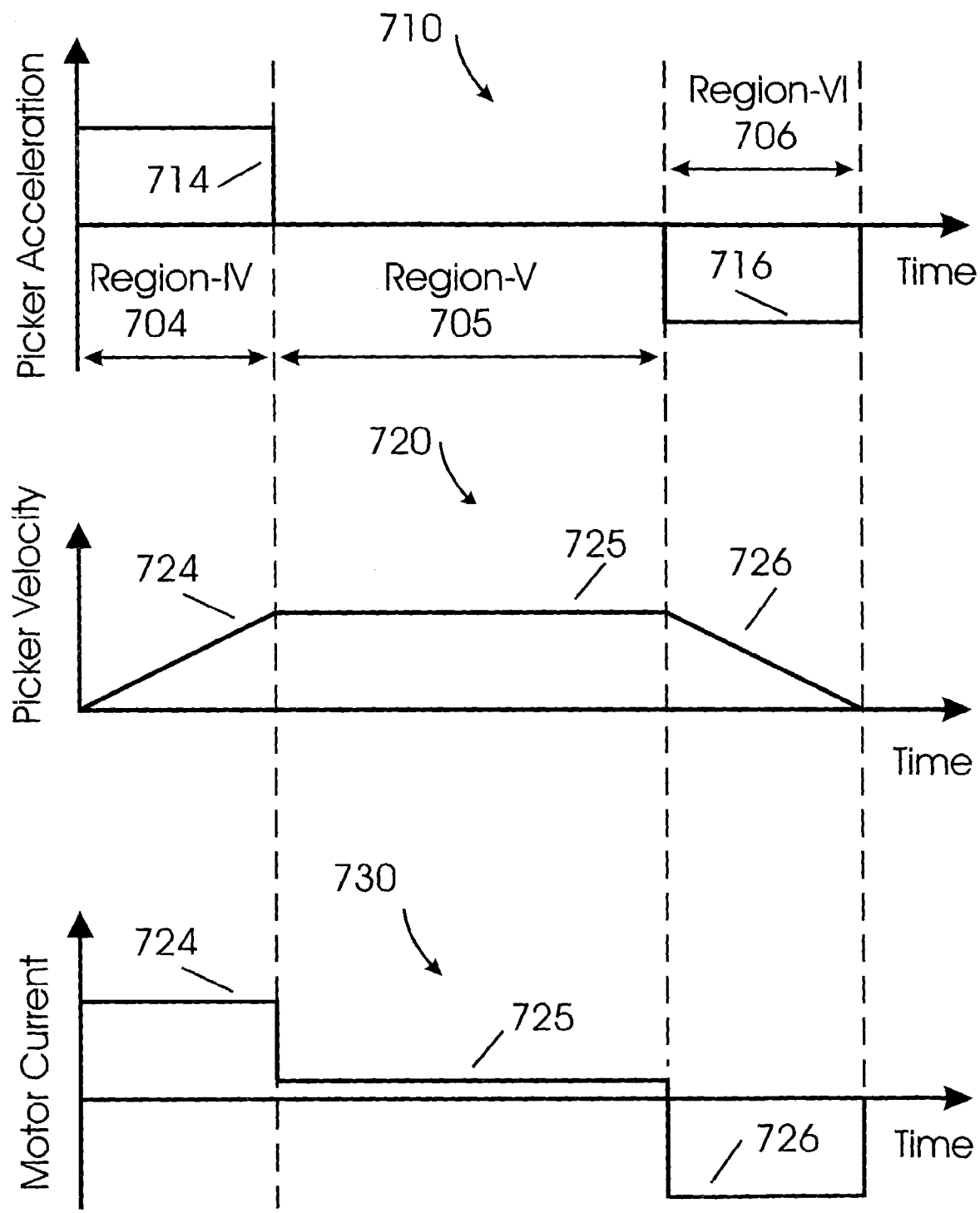
FIG. 7 depicts typical current usage to move the robotic picker in the automated tape library of FIG. 6.

Robotic library 600 is actually designed to be attached in the Y-Z plane with other robotic libraries 600, to provide a long library supporting many thousands of tape cartridges or cassettes and many tape drives. This requires that robotic picker 620 seek or traverse long distances along the horizontal X-axis. As depicted in FIG. 7, the profiles of constant picker-acceleration 710, picker-velocity profile 720, and motor-current profile 730 to move picker 620 have the same general geometric shape as the tape reel acceleration profile 310, tape velocity 320, and motor current profile 330 in FIG. 3. The precise values of current needed and the duration of the application of the current needed by the picker motor is generally quite different from the current needed and the duration of the application of the current needed by the tape drive motors 201/401 and 205/405. However, a constant-acceleration region-IV 704 and a constant-acceleration region-VI 706 are preferred in picker-acceleration profile 710.

The picker acceleration in region-V 705 is preferably zero, which results in the velocity of the picker being constant in this region, as shown in picker-velocity 725. With constant picker-acceleration 714 in region-IV 704, picker-velocity 724 is a ramp going from zero velocity to the value of the constant velocity 725. With constant picker-deceleration 716 in region-VI, picker-velocity is a ramp going from constant velocity 725 back to zero velocity. Thus, picker-velocity profile 720 is that of a trapezoid, as is tape-velocity profile 320 in FIG. 3.

The current to move robotic picker 620 is shown in motor current profile 730. A large motor current 724 is needed in constant acceleration region-IV 704 to accelerate the mass of the picker up to the constant velocity 725. Once the robotic picker has achieved constant velocity 725 in region-V 705, the robotic picker moves at this constant velocity, until it is time for the picker to decelerate to a stop, either to pick up or drop off a tape cartridge at a storage cell 606 or a tape drive 602. In order to stop at the desired spot, robot picker 620 is decelerated in region-VI 706 with motor current 726 acting in the opposite polarity of acceleration current 724. Motor current 726 decelerates the mass of robotic picker 620 until robotic picker 620 stops at the desired destination for either cartridge/cassette drop off or cartridge/cassette retrieval.

Even though the values of current and the duration in time of the application of that current varies between FIGS. 7 and 3, the physics of the two figures are the same. The theoretical motor currents required in FIGS. 3, 5, and 7 can be either measured or calculated in the laboratory and stored in ROM 251, or these theoretical motor currents can be calculated on the fly by microprocessors, such as microprocessor 240, or a microprocessor in controller 840 of FIG. 8.

Figure 8:
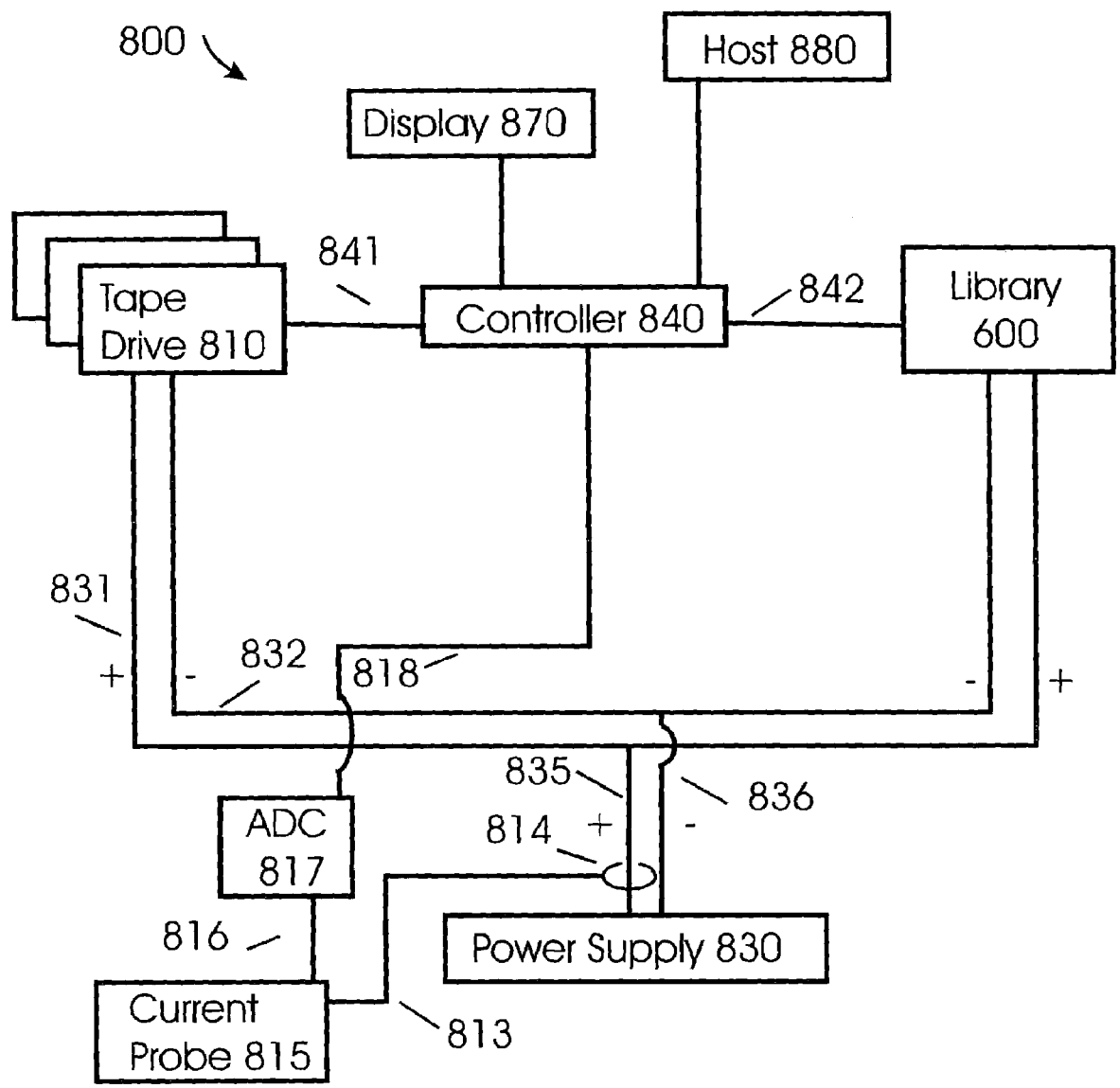
FIG. 8 depicts the sampling of the total current used by all tape drives and the robotic picker within the tape library of FIG. 6.

FIG. 8 teaches a plurality of tape drives 810, which may be either single-reel cartridge drives such as shown in FIG. 1 or dual reel cassette tape drives such as the IBM Magstar MP 3570 tape drive. These tape drives 810, and library 600 which houses them, receive electrical current from power supply 830 via positive polarity conductor 831 and negative polarity conductor 832. Positive polarity conductor 831 is connected to power supply 830 via conductor 835 and negative polarity conductor 832 is connected to power supply 832 via negative polarity conductor 836.

Current probe 815 measures the current passing through positive polarity conductor 835 via loop 814, which circles positive polarity conductor 835. Loop 814 is electrically connected to current probe 815 via cable 813. ADC 817 samples the analog output of current probe 815 and digitizes it. The digital signal is sent to controller 840 via line 818. Controller 840 can display the status of data I/O operations on display 870. Controller 840 responds to data I/O requests issued by host 880.

Figure 9:
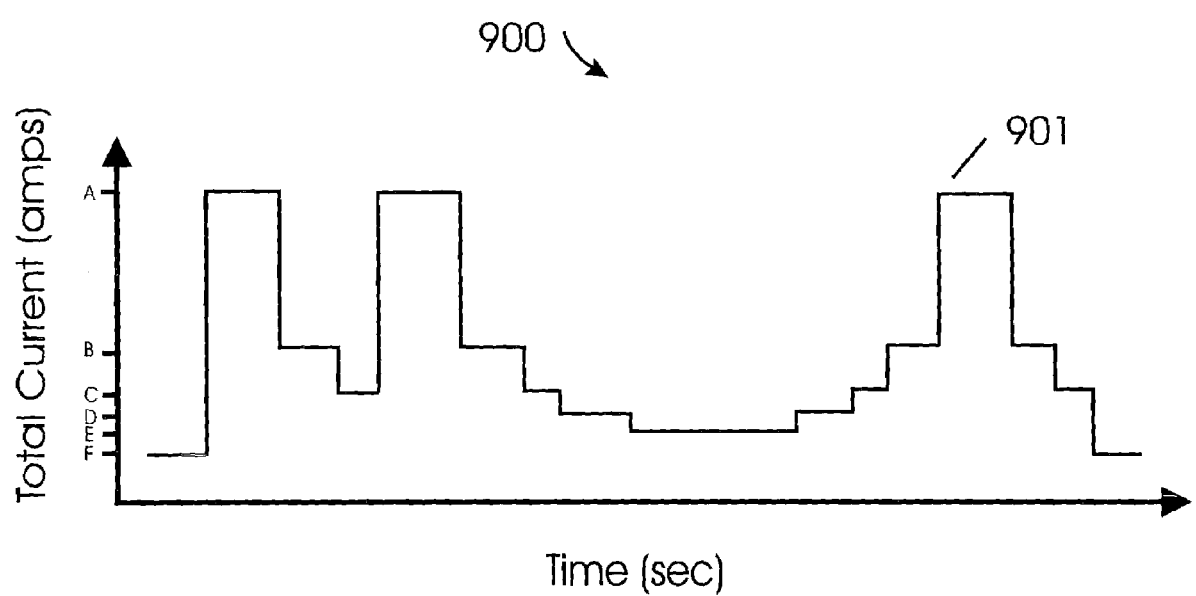
FIG. 9 depicts the theoretical current used, based on known activity.

Controller 840 controls the data I/O of tape drives 810 and the motion of robotic picker 620 in library 600. Controller 840 receives the theoretical currents required by tape drives 810, as shown in FIGS. 3 and 5, and the theoretical current required to move the robotic picker, as shown in FIG. 7, and sums these currents into the total theoretical current required profile 900, FIG. 9. The total theoretical current required 901 varies with time, depending on the operations of tape drives 810 and robotic picker 620 in library 600.

Figure 10:
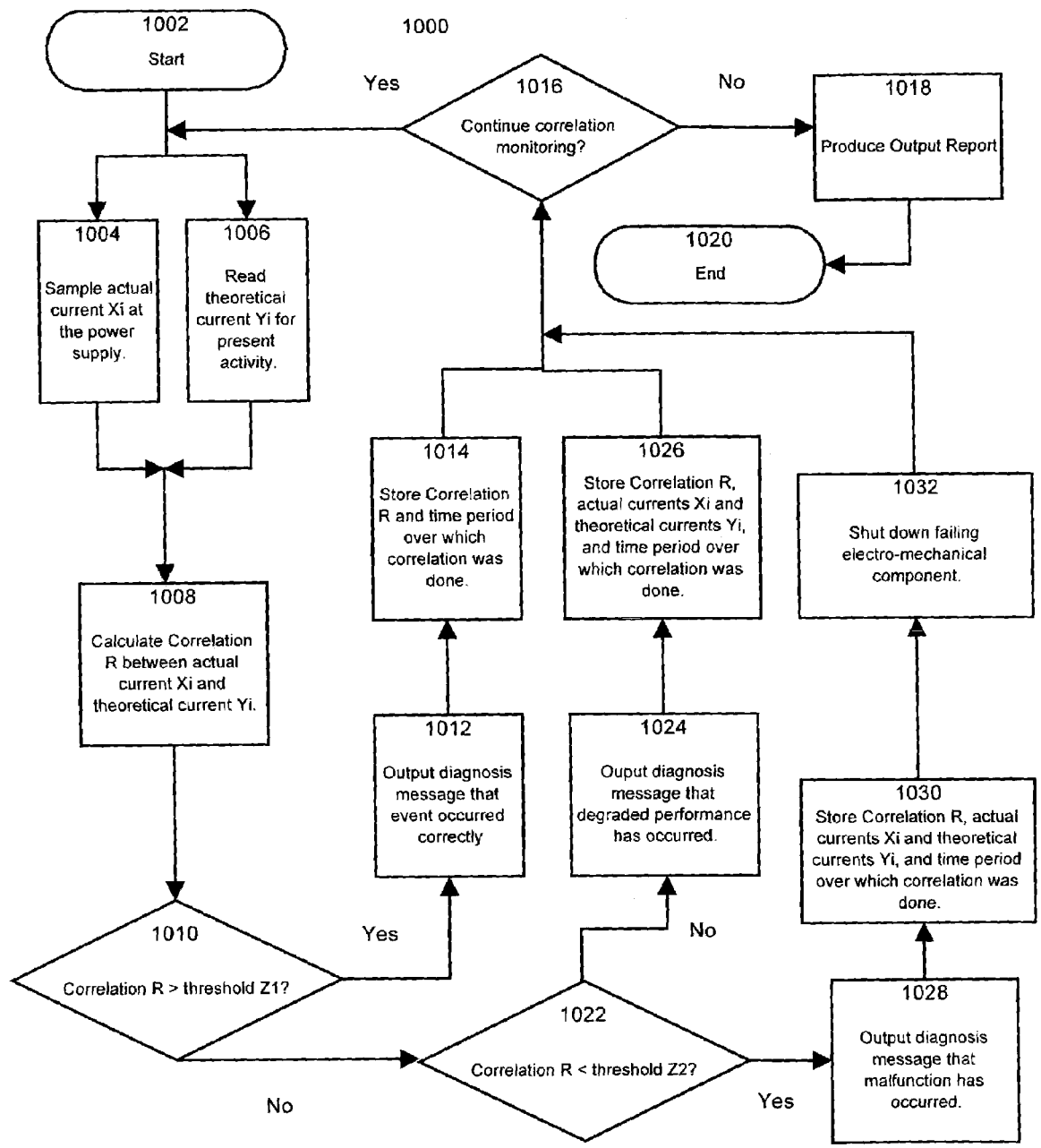
FIG. 10 depicts a flowchart of actions taken based on the correlation of actual current used versus theoretical current.

FIG. 10 illustrates preferred algorithm 1000 for correlating the theoretical current required versus the actual current required for FIGS. 2, 4, and 8. The process starts at step 1002 and flows to two steps which are done in parallel. In step 1004, ADC's 217, 227, 417, and/or 817 sample the actual current and the values sampled are stored in vector Xi. In parallel with step 1004, the theoretically required current vector Yi is read from random access memory, such as ROM 251. Both steps 1004 and 1006 flow to step 1008, where the correlation coefficient R is calculated for the equal-length vectors Yi and Xi.

The equation for the correlation coefficient R is well known in statistics. M refers to the number of samples in each of equal length vectors Xi and Yi. The equation is:

Numerator=$M$*Sum($Xi$*$Yi$)−[Sum($Xi$)]*[Sum($Yi$)]

Term_$A$=$M$*[Sum($Xi$*$Xi$)]−[Sum($Xi$)]*[Sum($Xi$)]

Term_$B$=$M$*[Sum($Yi$*$Yi$)]−[Sum($Yi$)]*[Sum($Yi$)]

$R$=Numerator/SQRT(Term_$A$*Term_$B$)

The correlation coefficient R has a numerical value between −1 and +1. A correlation of +1, or 100%, represents a perfect correlation between the equal length vectors Xi and Yi. A correlation of −1 represents a perfectly inverse correlation between the equal length vectors Xi and Yi. Finally, a correlation of 0 represents that there is no correlation at all between the equal length vectors Xi and Yi.

The process flows from step 1008 to step 1010, where the correlation coefficient R just calculated is compared against a first correlation threshold Z1. If the correlation coefficient just calculated exceeds correlation threshold Z1, i.e, correlation coefficient R passes threshold Z1, the process flows to step 1012, where an output diagnosis message is generated that the events occurred correctly. This message could be displayed on display 270 in FIGS. 2 and 4 or display 870 of FIG. 8. In addition, this message could be sent via the Simple Network Management Protocol to host 880, for dissemination for customer engineers, field engineers, and system administrators, who are all interested in the health and productivity of tape drives 200 and 400, library 600, and storage subsystem 800 of FIG. 8. As shown in Table 1, the status for a healthy electromechanical components with a high correlation between the theoretical current and the actual current would be reported via a code point of 1 in the SNMP Management Information Base (MIB) file associated with tape drives 200 and 400, library 600, and storage subsystem 800, as shown in Table 1.

TABLE 1

Code Points for MIB file for SNMP Alert Messages

| MIB Code Point | Message | Action to be taken |
| --- | --- | --- |
| 1 | Statistical value passes first threshold. | None: activity occurred correctly and system is healthy. |
| 2 | Statistical value fails first threshold but passes second threshold. | Investigate: some degradation noticed in activity. |
| 3 | Statistical value fails second threshold. | Activity failed. Shut down failing electro-mechanical component before customer data is irretrievably lost. |

In the trap format defined in SNMP RFC (Request for Change) 1157, which is available at http://www.faqs.org/rfcs/rfc1157.html, the code points in Table 1 would preferably be listed in the SNMP trap Protocol Data Unit (PDU) as the following specific trap type integers: specific trap type INTEGER {healthy(1), degraded(2), shutdown(3)}.

The process then flows from step 1012 to step 1014, where the correlation coefficient R is stored, as well as the time period over which the correlation was done is stored.

Figure 13:
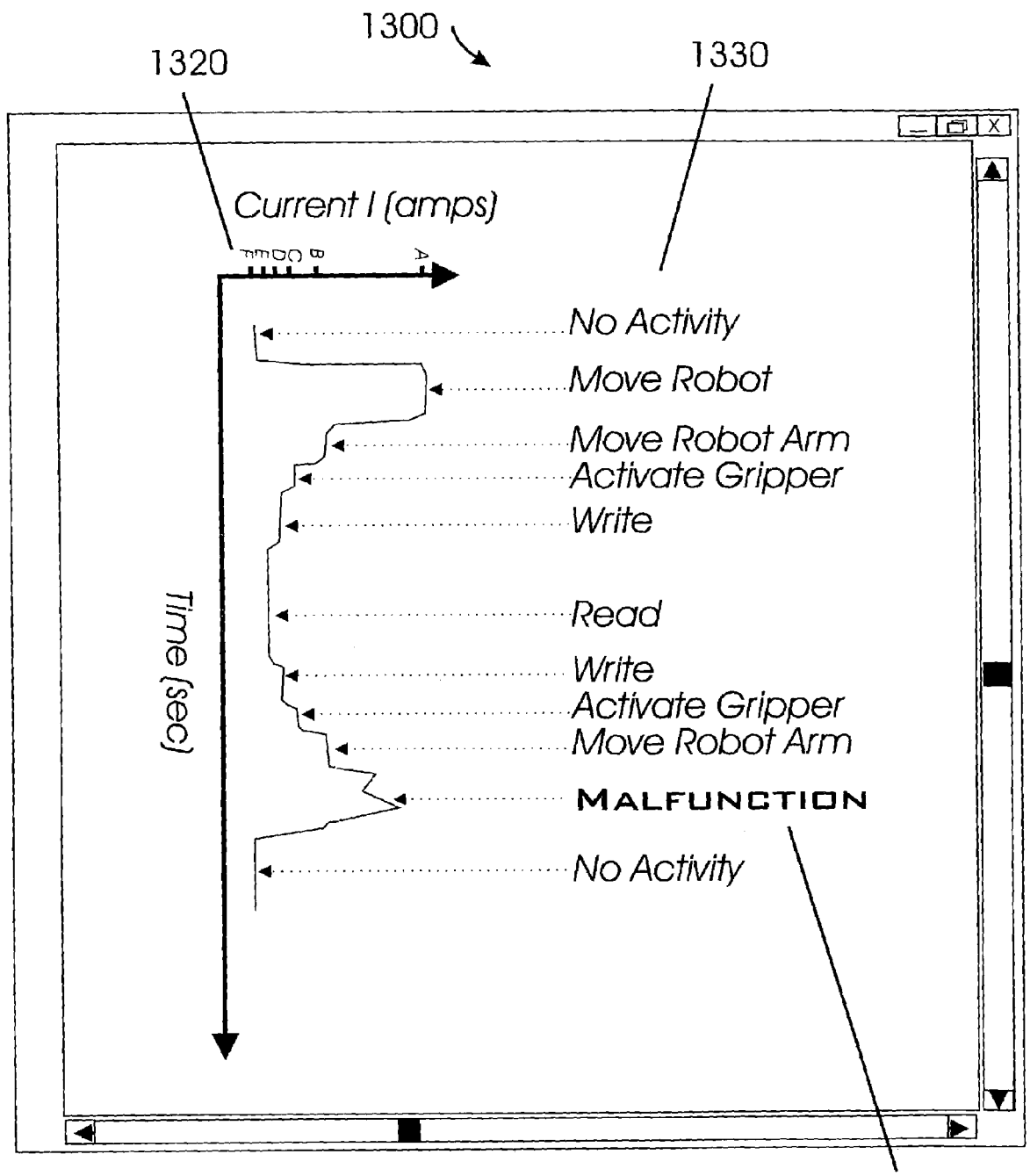
FIG. 13 depicts a typical output report indicating where a malfunction occurred.

This storage may be in RAM 252 or may be stored in controller 840 or host 880. From step 1014, the process flows to step 1016 where the question is asked whether to continue the correlation monitoring. Some customers may desire 24×7, or continual monitoring, whereas other customers may select specific time intervals for monitoring. If monitoring is to continue, step 1016 flows back to start 1002. However, if monitoring is to conclude for the meantime, the process flows to step 1018 where a final output report is produced, such as shown in FIG. 13, and then the process ends in step 1020.

If the correlation coefficient R is not greater than correlation threshold Z1 in step 1010, i.e., correlation coefficient R fails threshold Z1, the process flows from step 1010 to step 1022, where the correlation coefficient R is checked to determine whether it is less than correlation threshold Z2. Correlation coefficient Z1 is effectively a high-water mark and if the correlation coefficient R exceeds this high water mark, the tape drives 200 and 400, library 600, and/or storage subsystem 800 are deemed healthy. However, correlation threshold Z2 is effectively a low water mark. If correlation coefficient R is less than correlation threshold Z2, i.e, correlation coefficient R fails Z2, then the tape drives 200 and 400, library 600, and/or storage subsystem 800 are deemed unhealthy and the process flows to step 1028 and an output diagnosis message that malfunction has occurred is generated. This message could be displayed on display 270 in FIGS. 2 and 4 or display 870 of FIG. 8. In addition, this message could be sent via the Simple Network Management Protocol to host 880, for dissemination for customer engineers, field engineers, and system administrators, who are all interested in the health and productivity of tape drives 200 and 400, library 600, and storage subsystem 800 of FIG. 8. As shown in Table 1, the status for a electromechanical component with a low correlation between the theoretical current and the actual current would be reported via a code point of 3 in the Management Information Base (MIB) file associated with tape drives 200 and 400, library 600, and storage subsystem 800, as shown in Table 1, to indicate a failing electromechanical component. The process then flows from step 1028 to step 1030 where the correlation R, the actual current vector Xi and the theoretical current vector Yi, and the time period over which the correlation was done is stored. This storage may be in RAM 252 or may be stored in controller 840 or host 880. The process flows from step 1030 to step 1032, where the failing electromechanical component is shut down. If a tape drive motor 201/205 or 401/405 is failing in step 1032, then only the offending tape drive 810 need be shut down in storage subsystem 800 of FIG. 8. However if robotic picker 620 is failing in library 600, and there is only one robotic picker 620 in library 600, then the entire storage subsystem 800 will need to be shut down until repairs are made.

The process flows from step 1032 to step 1016, to see if the correlation monitoring should continue. If the entire storage subsystem 800 is shut down or the time to continue monitoring has expired, the process flows from step 1016 to step 1018 as previously described. Otherwise, the process flows from step 1016 to start 1002.

If the correlation coefficient R is higher than correlation threshold Z2 in step 1022, i.e., correlation coefficient R passes Z2, the process flows from step 1022 to step 1024. In this case tape drives 200 and 400, library 600, and/or storage subsystem 800 are deemed to have degraded performance because the correlation coefficient R is less than the high water mark Z1 yet better than the low water mark Z1. In other words, the electromechanical components are still functioning, but failure is likely in the near future of electromechanical components in tape drives 200 and 400, library 600, and/or storage subsystem 800. The process flows from step 1022 to step 1024, where an output diagnosis message that degraded performance has occurred is generated. This message could be displayed on display 270 in FIGS. 2 and 4 or display 870 of FIG. 8. In addition, this message could be sent via the Simple Network Management Protocol to host 880, for dissemination for customer engineer, field engineers, and system administrators, who are all interested in the health and productivity of tape drives 200 and 400, library 600, and storage subsystem 800 of FIG. 8. As shown in Table 1, the status for a degraded electromechanical components would be reported via a code point of 2 in the Management Information Base (MIB) file associated with tape drives 200 and 400, library 600, and storage subsystem 800, as shown in Table 1, to indicate the degraded performance of an electromechanical component. The process then flows from step 1024 to step 1026 where the correlation R, the actual current vector Xi and the theoretical current vector Yi, and the time period over which the correlation was done is stored. This storage may be in RAM 252 or may be stored in controller 840 or host 880. The process flows to step 1016, where the question whether to continue correlation monitoring is asked, as previously discussed.

Figure 16:
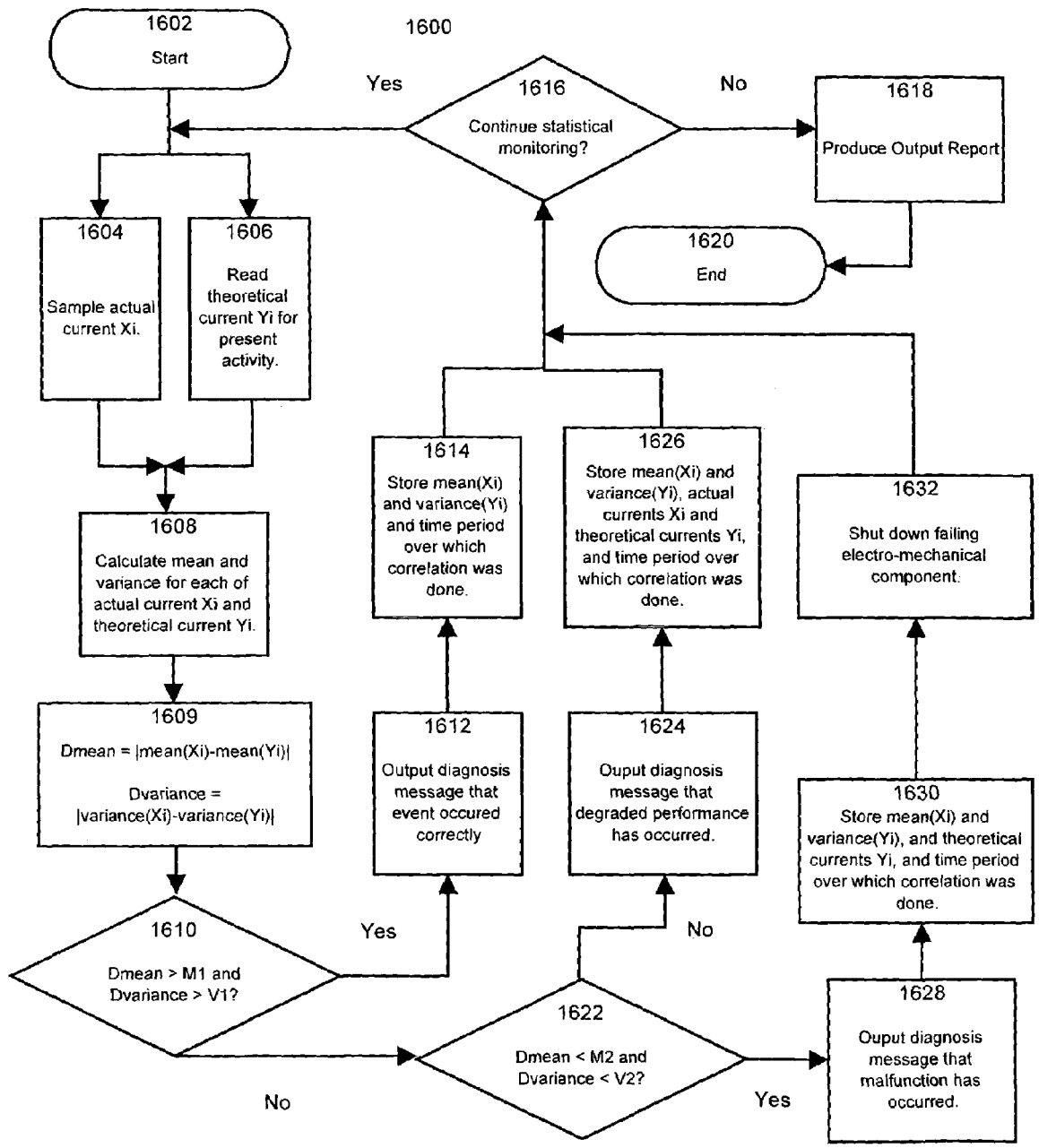
FIG. 16 depicts a flowchart of actions taken based on the mean and standard deviation of actual current used versus theoretical current.

In FIG. 16, the numerical values of Z1 and Z2 could be made equal. If this were done, then steps 1024 and 1026 would not be executed. Setting Z1=Z2 would then permit only a binary assessment of the health of the system, namely either the system was healthy as established in steps 1012 and 1014, or the system had malfunctioned as established in steps 1028, 1030, and 1032.

Figure 11:
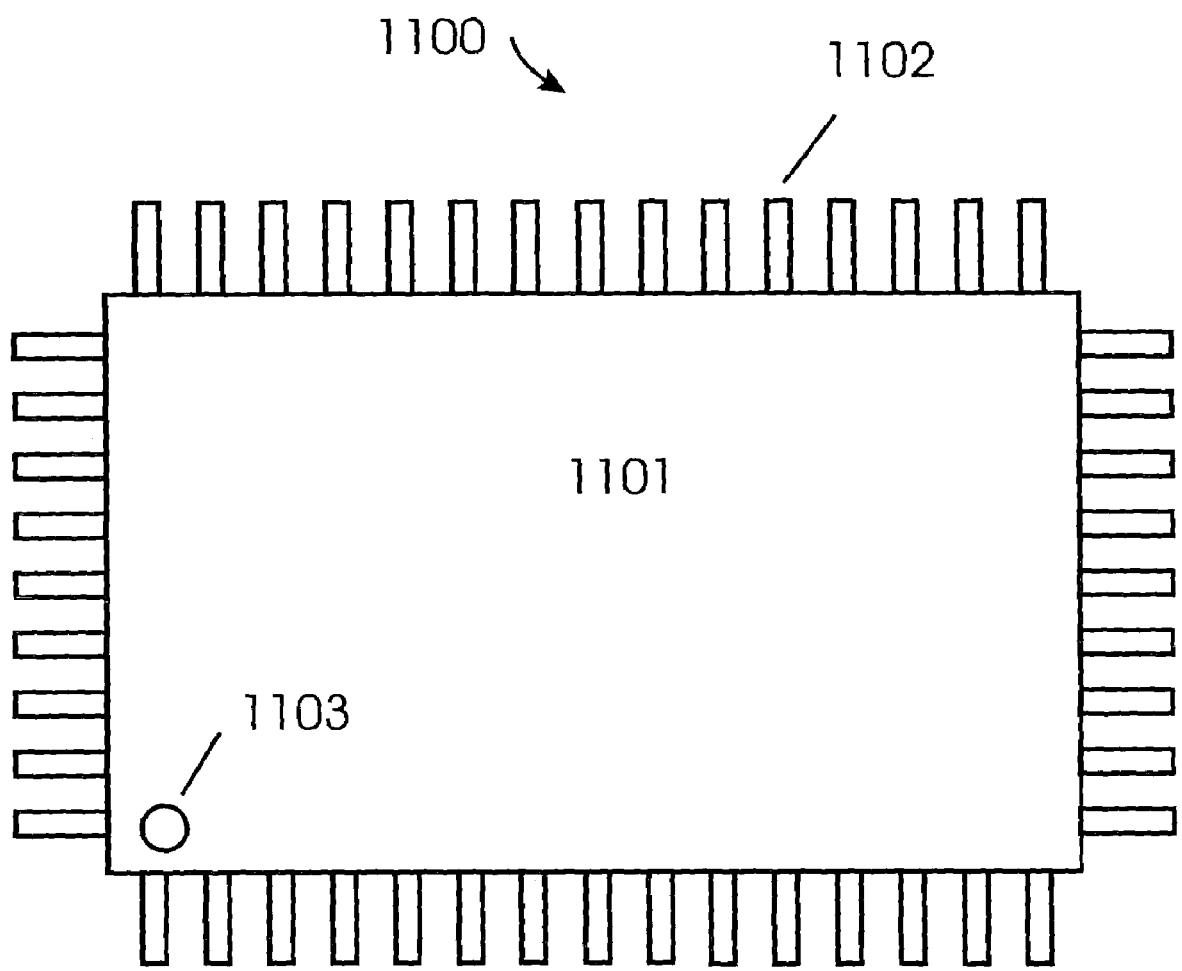
FIG. 11 depicts a semiconductor chip for storing microcode used to execute the flowchart of FIG. 10.

The algorithm described in the flowchart in FIG. 10 is preferably stored in an information bearing semiconductor chip 1100, as shown in FIG. 11. Chip 1100 may be a RAM, EPROM, or ASIC chip, etc. The exterior of chip 1100 shows a typically square or rectangular body 1101 with a plurality of electrical or optical connectors 1102 along the perimeter of body 1101. There is typically an alignment dot 1103 at one corner of chip 1100 to assist with the proper alignment of chip 1100 on a card. Within body 1101, chip 1100 consists of a number of interconnected electrical elements, such as transistors, resistors, and diodes as well as possible optical-electrical (opto-electrical) components. These interconnected electrical elements are fabricated on a single chip of silicon crystal, or other semiconductor material such as gallium arsenide (GaAs), silicon, or nitrided silicon, by use of photolithography. One complete layering-sequence in the photolithography process is to deposit a layer of material on the chip, coat it with photoresist, etch away the photoresist where the deposited material is not desired, remove the undesirable deposited material which is no longer protected by the photoresist, and then remove the photoresist where the deposited material is desired. By many such photolithography layering-sequences, very-large-scale integration (VLSI) can result in tens of thousands of electrical elements on a single chip. Ultra-large-scale integration (ULSI) can result in a hundred thousand electrical elements on a single chip. Algorithms such as the flowchart in FIG. 11, as well as the theoretical currents shown in FIGS. 3, 5, and/or 7 can be stored in chip 1100. Chip 1100 would be used as ROM 251 in FIGS. 2 and 4.

Figure 12:
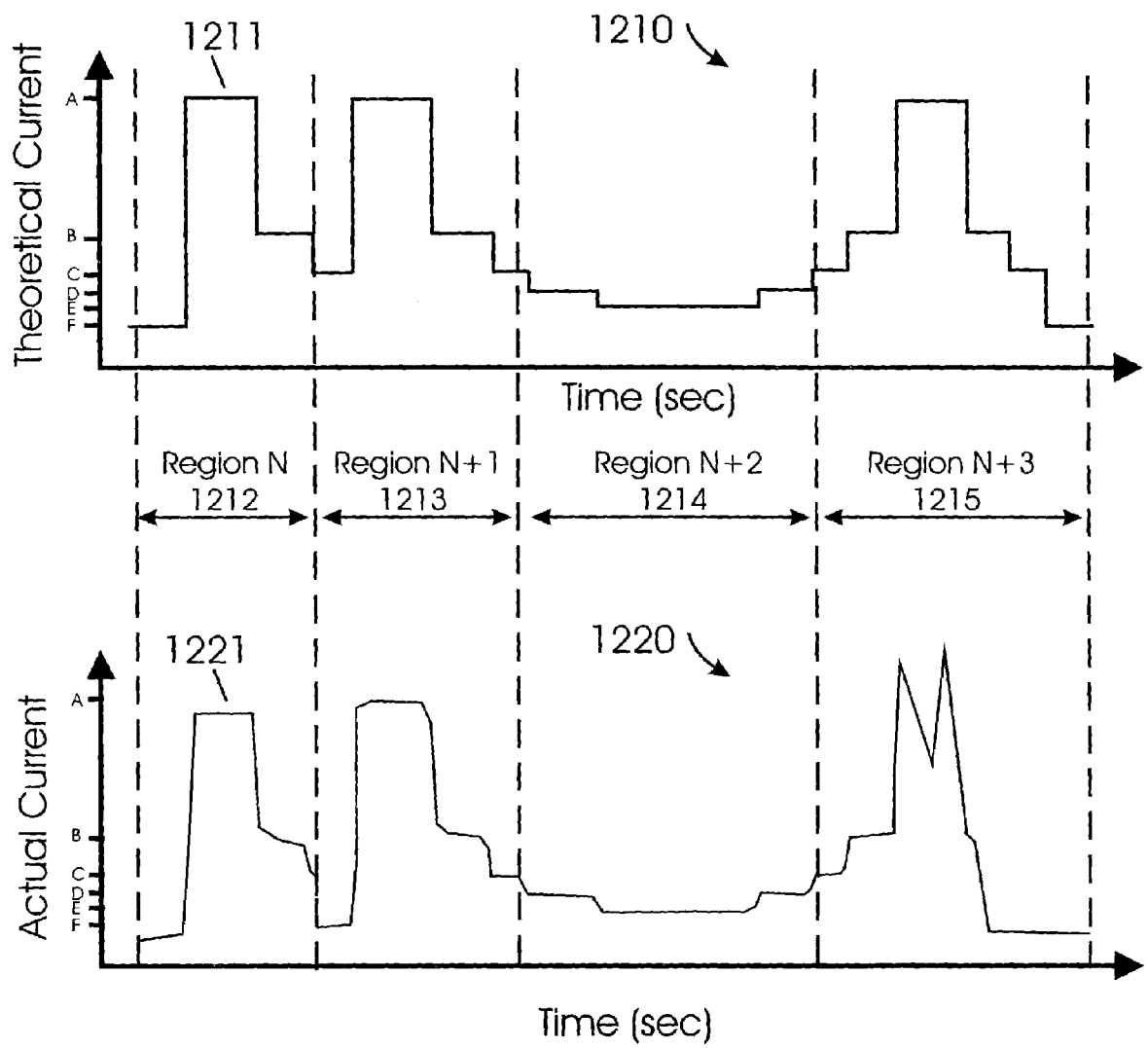
FIG. 12 depicts a comparison between theoretical current used versus actual current used.

FIG. 12 depicts theoretical current profile 1210 expressed as current 1211 versus time. Additionally, FIG. 12 shows actual current profile 1220 expressed as current 1221 versus time. Theoretical current profile 1210 is the summation of all of the currents needed in tape drives 200 and 400, library 600, and/or storage subsystem 800 of FIG. 8. Theoretical current profile 1210 would be read as vector Yi in step 1006 of FIG. 10. Actual current profile 1220 is sampled and those samples stored in vector Xi in step 1004.

FIG. 12 is divided into four regions: region N, 1212; region N+1, 1213; region N+2, 1214; and region N+3, 1215. In regions N, N+1, and N+2 it can be visually seen that there is a high correlation between the theoretical current and the actual current required. However, in region N+3, 1215, it can be seen that the actual current deviates from the theoretical current and thus there would be a low correlation in region N+3.

Based on the comparisons in FIG. 12, output diagnostic message 1300 is shown in FIG. 13. Message 1300 shows the actual current profile versus time 1320. Additionally, the activity of tape drives 200 and 400, library 600, and/or storage subsystem 800 of FIG. 8 is shown in explanatory comments 1330. Finally, where the correlation coefficient R dropped below correlation threshold Z2, in step 1022 of FIG. 10, a MALFUNCTION comment 1331 is shown. This would aid customer engineers, field engineers, and system administrators to isolate, identify, and repair the failed electromechanical component.

Figure 14:
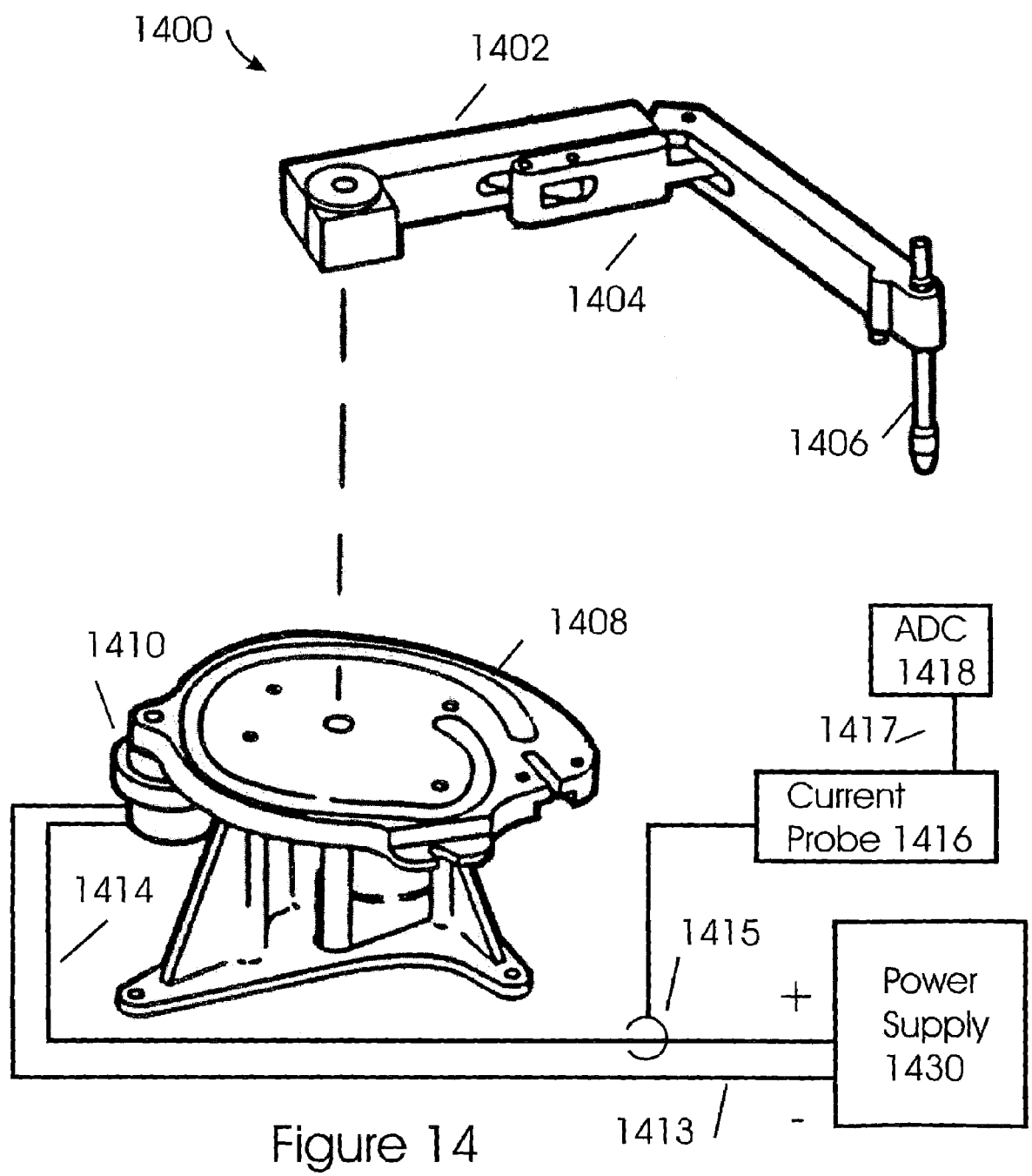
FIG. 14 depicts a tape threader mechanism.

FIG. 14 depicts an exploded view of tape threader 1400, which is a detailed view of tape threader 104 of FIG. 1. Motor 1410 rotates hinged beam 1402. Four-bar linkage 1404 follows cam surface 1408, thus extending threading pin 1406 in a controlled fashion to thread the leader block of the IBM 3480, 3490, and 3590 tape cartridges through the tape path of tape drive 100 shown in FIG. 1. Motor 1410 receives current from positive polarity wire 1414 and negative polarity wire 1413, both of which are connected to power supply 1430. The current in positive polarity wire 1414 is measured via current probe 1416 and loop 1415, which circles positive polarity wire 1414. The output of current probe 1416 is connected to ADC 1418 via wire 1417. The output of ADC 1418 then goes to microprocessor 240 or controller 840.

Figure 15:
FIG. 15 depicts a comparison between theoretical current used versus actual current used in a tape threader.

FIG. 15 depicts theoretical current profile 1510 and actual current profile 1520 for a tape threader such as shown in FIG. 14. Theoretical current 1511 is stored as Yi and actual current 1521 is stored as Xi. Region 1530 shows where the actual current 1521 deviates from the theoretical current 1511. The correlation coefficient R of flowchart 10 could be used to show that the actual current 1521 is deviating from the theoretical/ideal/desired current 1511. Alternately, the statistical mean and variance could be used to show that the actual current 1521 is deviating from the theoretical/ideal/desired current 1511.

FIG. 16 illustrates preferred algorithm 1600 for statistically looking for similarities between the theoretical/ideal/desired current required versus the actual current required for FIGS. 2, 4, 8, and 14. The process starts at step 1602 and flows to two steps which are done in parallel. In step 1604, ADC's 217, 227, 417, 817, and/or 1418 sample the actual current and the values sampled are stored in vector Xi. In parallel with step 1604, the theoretically required current vector Yi is read from random access memory, such ROM 251. Both steps 1604 and 1606 flow to step 1608, where the mean and variance is each calculated for equal length vectors Yi and Xi.

The equations for mean and variance are well known in statistics. M refers to the number of samples in each of equal length vectors Xi and Yi. The equations for the mean are:

$$\mathrm{Mean}(Xi)=[\mathrm{Sum}(Xi)]/M$$

$$\mathrm{Mean}(Yi)=[\mathrm{Sum}(Yi)]/M$$

The equations for variance are shown below, where the symbol ^ denotes exponentiation:

$$\mathrm{Variance}(Xi)=[\mathrm{Sum}(Xi-\mathrm{mean}(Xi))\char`\^2]/(M-1)$$

$$\mathrm{Variance}(Yi)=[\mathrm{Sum}(Yi-\mathrm{mean}(Yi))\char`\^2]/(M-1)$$

The process flows from step 1608 to step 1609, where the differential mean and variance are calculated. The equation for the differential mean is the absolute value of the difference between the mean(Xi) and the mean(Yi):

$$D\mathrm{mean}=|\mathrm{mean}(Xi)-\mathrm{mean}(Yi)|$$

The equation for the differential variance is the absolute value of the difference between the variance(Xi) and the variance(Yi):

$$D\mathrm{variance}=|\mathrm{variance}(Xi)-\mathrm{variance}(Yi)|$$

The process then flows from step 1609 to step 1610, where the differential mean just calculated is compared against mean-threshold M1 and the differential variance just calculated is compared against variance threshold V1. If the differential mean and the differential variance are both less than their respective thresholds, i.e., the differential mean and differential variance pass M1 and V1 respectively, the process flows to step 1612, where an output diagnosis message is generated that the events occurred correctly. This message could be displayed on display 270 in FIGS. 2 and 4 or display 870 of FIG. 8. In addition, this message could be sent via the Simple Network Management Protocol to host 880, for dissemination for customer engineers, field engineers, and system administrators, who are all interested in the health and productivity of tape drives 200 and 400, library 600, storage subsystem 800 of FIG. 8, and the threader in FIG. 14.

The process then flows from step 1612 to step 1614, where mean (Xi) and variance (Yi) are stored, as well as the time period over which the correlation was done is stored. This storage may be in RAM 252 or may be stored in controller 840 or host 880. From step 1614, the process flows to step 1616 where the question is asked whether to continue the statistical monitoring. Some customers may desire 24×7, or continual monitoring, whereas other customers may select specific time intervals for monitoring. If monitoring is to continue, step 1616 flows back to start 1602. However, if monitoring is to conclude for the meantime, the process flows to step 1618 where a final output report is produced, such as shown in FIG. 13, and then the process ends in step 1620.

If the differential mean and the differential variance were not both less than their respective thresholds M1 and V1 in step 1610, i.e., the differential mean and differential variance fail M1 and V1 respectively, the process flows to step 1622, where the differential mean just calculated is compared against a second user-selectable mean-threshold M2 and the differential variance just calculated is compared against a second user-selectable variance threshold V2. If the differential mean and differential variance both exceed M2 and V2, i.e., the differential mean and differential variance fail M2 and V2 respectively, then the tape drives 200 and 400, library 600, storage subsystem 800, and threader 1400 are deemed unhealthy and the process flows to step 1628 and an output diagnosis message is generated that malfunction has occurred. This message could be displayed on display 270 in FIGS. 2 and 4 or display 870 of FIG. 8. In addition, this message could be sent via the Simple Network Management Protocol to host 880, for dissemination for customer engineers, field engineers, and system administrators, who are all interested in the health and productivity of tape drives 200 and 400, library 600, storage subsystem 800 of FIG. 8, and/or threader 1400 of FIG. 14.

The process then flows from step 1628 to step 1630 where the mean (Xi) and variance (Yi), the actual current vector Xi and the theoretical current vector Yi, and the time period over which the correlation was done is stored. This storage may be in RAM 252 or may be stored in controller 840 or host 880. The process flows from step 1630 to step 1632, where the failing electro-mechanical component is shut down. If a tape drive motor 201/205 or 401/405, or threader 1400, is failing in step 1632, then only the offending tape drive 810 need be shut down in storage subsystem 800 of FIG. 8. However if robotic picker 620 is failing in library 600, and there is only one robotic picker 620 in library 600, then the entire storage subsystem 800 will need to be shut down until repairs are made.

The process flows from step 1632 to step 1616, to see if the correlation monitoring should continue. If the entire storage subsystem 800 is shut down or the time to continue monitoring has expired, the process flows from step 1616 to step 1618 as previously described. Otherwise, the process flows from step 1616 to start 1602.

If the differential mean falls between M1 and V1, and differential variance falls between V1 and V2 in step 1622, i.e., differential mean and differential variance pass thresholds M2 and V2 respectively, the process flows from step 1622 to step 1624. In this case tape drives 200 and 400, library 600, storage subsystem 800, and/or threader 1400 are deemed to have degraded performance because either the differential mean is between M1 and M2, or the differential variance is between V1 and V2, or both. In other words, the electromechanical components are still functioning, but failure is likely in the near future of electromechanical components in tape drives 200 and 400, library 600, storage subsystem 800, or threader 1400. The process flows from step 1622 to step 1624, where an output diagnosis message that degraded performance has occurred is generated. This message could be displayed on display 270 in FIGS. 2 and 4 or display 870 of FIG. 8. In addition, this message could be sent via the Simple Network Management Protocol to host 880, for dissemination for customer engineers, field engineers, and system administrators, who are all interested in the health and productivity of tape drives 200 and 400, library 600, storage subsystem 800 of FIG. 8, and/or threader 1400 of FIG. 14. The process then flows from step 1624 to step 1626 where mean (Xi), variance (Yi), the actual current vector Xi and the theoretical current vector Yi, and the time period over which the correlation was done is stored. This storage may be in RAM 252 or may be stored in controller 840 or host 880. The process flows to step 1616, where the question whether to continue correlation monitoring is asked, as previously discussed.

In FIG. 16, the numerical values of M1 and M2 could be made equal, and the numerical values of V1 and V2 could be made equal. If this were done, then steps 1624 and 1626 would not be executed. Setting M1=M2 and V1=V2 would then permit only a binary assessment of the health of the system, namely either the system was healthy as established in steps 1612 and 1614, or the system had malfunctioned as established in steps 1628, 1630, and 1632.

Like the algorithm described in the flowchart in FIG. 10, the algorithm described in the flowchart in FIG. 16 is preferably stored in an information bearing semiconductor chip 1100, as shown in FIG. 11.

While the invention has been shown and described with reference to a particular embodiment thereof, it will be understood to those skilled in the art, that various changes in form and details may be made therein without departing from the spirit and scope of the invention. For example, optical disk drives with optical disk media in cartridges could be used instead of tape drives 810 in storage subsystem 800 of FIG. 8. Library 600 of FIG. 6 and FIG. 8 would still need a robotic picker 620 to move the optical media between storage cells 606 and the optical disk drives. The optical disk drives have a spindle motor to accelerate the disk to the recording velocity and to decelerate the disk to a stop once the data I/O has concluded. In particular, for constant angular velocity magneto-optical (MO) media, the acceleration, trapezoidal-shaped velocity profile, and motor current required in FIG. 3 are generally the same as required in an MO disk drive. Thus, all of the above can be applied to optical disk drives and optical disk libraries. Similarly, all of the above can be applied to hard disk drives, either in a stand-alone configuration, in a personal computer (PC) configuration, or in a RAID (redundant array of inexpensive disks) array or a RAID NAS (network attached storage).

We claim:

1. A method for monitoring the activity of a system of one or more electro-mechanical components, said system having a memory and a microprocessor, said electro-mechanical components receive electrical current from a power supply, comprising the steps of:

sampling an actual current supplied to said electro-mechanical component from said power supply during said activity;

reading a theoretical current for said activity from said memory; and calculating a statistical value for said actual current and said theoretical current via said microprocessor; and outputting a diagnostic message based on said statistical value.

2. The method of claim 1, further comprising the steps of:

comparing said statistical value to a first threshold value; and outputting a diagnostic message that said activity occurred correctly when said statistical value passes said first threshold value.

3. The method of claim 2, further comprising the steps of:

comparing said statistical value to a second threshold value; and outputting a diagnostic message that said activity is degraded when said statistical value fails said first threshold value but passes said second threshold value.

4. The method of claim 3, further comprising the steps of:

shutting down said electro-mechanical component when said statistical value fails said second threshold value; and outputting a diagnostic message that said activity failed when said statistical value fails said second threshold value.

5. The method of claim 4, wherein said statistical value is a mean.

6. The method of claim 4, wherein said statistical value is a variance.

7. The method of claim 4, wherein said statistical value is a correlation.

8. The method of claim 4, further comprising the steps of:

determining a time period of the duration of said sampling of said actual current; and storing said time period in said memory.

9. The method of claim 4, further comprising the step of storing said statistical value in said memory.

10. A system for monitoring the activity of a system of one or more electro-mechanical components, said electro-mechanical components receive electrical current from a power supply, comprising:
means to sample an actual current supplied to said electro-mechanical component from said power supply during said activity;
means to read a theoretical current for said activity; and
means to calculate a statistical value for said actual current and said theoretical current; and means to output a diagnostic message based on said statistical value.

11. The system of claim 10, further comprising:
means to compare said statistical value to a first threshold value; and
means to send a diagnostic message that said activity occurred correctly when said statistical value passes said first threshold value.

12. The system of claim 11, further comprising:
means to compare said statistical value to a second threshold value; and
means to output a diagnostic message that said activity is degraded when said statistical value fails said first threshold value but passes said second threshold value.

13. The system of claim 12, further comprising:
means for shutting down said eleotro-mechanical component when said statistical value fails said second threshold value; and
means for outputting a diagnostic message that said activity failed when said statistical value fails said second threshold value.

14. The system of claim 13, wherein said statistical value is a mean.

15. The system of claim 13, wherein said statistical value is a variance.

16. The system of claim 13, wherein said statistical value is correlation.

17. The system of claim 13, further comprising:
means to determine a time period of the duration of said sample of said actual current; and
means to store said time period in a memory.

18. The system of claim 13, further comprising means to store said statistical value in a memory.

19. A logic array readable by a controller, tangibly embodying a program of instructions executable by said controller, to perform method steps for monitoring the activity of a system of one or more electro-mechanical components, said electro-mechanical components receive electrical current from a power supply, comprising the machine executed steps of:
said controller sampling an actual current supplied to said electro-mechanical component from said power supply during said activity;
said controller reading a theoretical current for said activity; and
said controller calculating a statistical value for said actual current and said theoretical theoretical current; and said controller outputting a diagnostic message based on said statistical value.

20. The logic array readable by a controller of claim 19, further comprising the machine executed steps of:
said controller comparing said statistical value to a first threshold value; and
said controller outputting a diagnostic message that said activity occurred correctly when said statistical value passes said first threshold value.

21. The logic array readable by a controller of claim 20, further comprising:
the machine executed step of comparing said statistical value to a second threshold value; and
the machine executed step of outputting a diagnostic message that said activity is degraded when said statistical value fails said first threshold value but passes said second threshold value.

22. The logic array readable by a controller of claim 21, further comprising:
the machine executed step of shutting down said electro-mechanical component when said statistical value fails said second threshold value; and
the machine executed step for outputting a diagnostic message that a failed operation has occurred when said statistical value fails said second threshold value.

23. The logic array readable by a controller of claim 22, wherein said statistical value is a mean.

24. The logic array readable by a controller of claim 22, wherein said statistical value is a variance.

25. The logic array readable by a controller of claim 22, wherein said statistical value is correlation.

26. The logic array readable by a controller of claim 22, further comprising the machine executed steps of:
said controller determining a time period of the duration of said sampling of said actual current; and
said controller storing said time period in a memory.

27. The logic array readable by a controller of claim 22, further comprising the machine executed step of storing said statistical value in memory.

* * * * *